US012286186B1

(12) United States Patent
Aikyo

(10) Patent No.: US 12,286,186 B1
(45) Date of Patent: Apr. 29, 2025

(54) AIRBAG DEVICE FOR SADDLE-TYPE VEHICLE

(71) Applicant: HONDA MOTOR CO., LTD., Tokyo (JP)

(72) Inventor: Yutaka Aikyo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/685,543

(22) PCT Filed: Sep. 24, 2021

(86) PCT No.: PCT/JP2021/035152
§ 371 (c)(1),
(2) Date: Feb. 22, 2024

(87) PCT Pub. No.: WO2023/047544
PCT Pub. Date: Mar. 30, 2023

(51) Int. Cl.
*B60R 21/26* (2011.01)
*B62J 27/20* (2020.01)
(52) U.S. Cl.
CPC ......... *B62J 27/20* (2020.02); *B60R 21/26005* (2013.01)
(58) Field of Classification Search
CPC ............ B60R 21/217; B60R 21/26005; B60R 2021/23382; B62J 27/20
See application file for complete search history.

(56) References Cited

U.S. PATENT DOCUMENTS

| 5,938,231 A | 8/1999 | Yamazaki | |
|---|---|---|---|
| 2023/0128190 A1* | 4/2023 | Aikyo | B62J 27/20 280/730.1 |

(Continued)

FOREIGN PATENT DOCUMENTS

| EP | 852192 A1 * | 7/1998 | ........... B60R 21/217 |
|---|---|---|---|
| JP | 8-183423 A | 7/1996 | |
| JP | 10-6901 A | 1/1998 | |

(Continued)

OTHER PUBLICATIONS

International Search Report dated Nov. 30, 2021, Application No. PCT/JP2021/035152; 4 pages.

(Continued)

*Primary Examiner* — James A English
(74) *Attorney, Agent, or Firm* — Rankin, Hill & Clark LLP

(57) ABSTRACT

An airbag device for a saddle-type vehicle which can restrict an airbag from being separated until the airbag is deployed so that the airbag can be separated in a deployed state. The airbag device includes an inflator and an airbag, and has a first restriction portion that restricts separation between the inflator and the airbag. The first restriction portion has an elastic member positioned inside the inflator. When the inflator releases a gas having a first gas release pressure, the elastic member is increased in diameter due to the gas pressure, and the inflator and the elastic member enter a locked state and restrict separation of the airbag. When the inflator releases a gas having a second gas release pressure, the elastic member diameter is decreased to be smaller than the diameter in the locked state, the locked state is canceled, and separation of the airbag is unrestricted.

12 Claims, 15 Drawing Sheets

(56) References Cited

U.S. PATENT DOCUMENTS

| | | | |
|---|---|---|---|
| 2023/0128268 A1* | 4/2023 | Aikyo | B62J 27/20 |
| | | | 280/736 |
| 2024/0190377 A1* | 6/2024 | Fukumoto | B60R 21/217 |

FOREIGN PATENT DOCUMENTS

| | | | | |
|---|---|---|---|---|
| JP | 2015-110368 A | 6/2015 | | |
| JP | 2017-178240 A | 10/2017 | | |
| WO | WO-2018016307 A1 * | 1/2018 | | B60R 21/217 |

OTHER PUBLICATIONS

Written Opinion of the International Search Authority dated Nov. 30, 2021, Application No. PCT/JP2021/035152; 3 pages.

English translation of the International Preliminary Report on Patentability issued Apr. 4, 2024 in the corresponding International application No. PCT/JP2021/035152 (5 pages).

* cited by examiner

AIRBAG DEVICE FOR SADDLE-TYPE VEHICLE

TECHNICAL FIELD

The present invention relates to an airbag device for a saddle-type vehicle.

BACKGROUND ART

Conventionally, regarding an airbag device for a saddle-type vehicle, a technology of separating an airbag from a vehicle body is known (see, for example, Patent Literature 1). Patent Literature 1 discloses a configuration in which a slide frame supporting an airbag module is guided by right and left guide rails due to inertial force at the time of impact, moves forward, and is detached from the right and left guide rails, so that the airbag is separated from a motorcycle. In Patent Literature 1, the airbag is separated from the motorcycle together with an inflator and the like.

CITATION LIST

Patent Literature

Patent Literature 1: JP 10-6901 A

SUMMARY OF INVENTION

Technical Problem

Incidentally, as a configuration in which an airbag is separated from a vehicle body, it is conceivable to separate the airbag from an inflator, but in a case where the airbag is separated from the inflator, it is necessary to separate the airbag from the inflator at an appropriate timing after the airbag is deployed. However, in the technology described in Patent Literature 1, since the inflator and the like are also configured to be separated from the vehicle body, there is no disclosure regarding the configuration in which the airbag is separated from the inflator.

The present invention is made in view of the above-described circumstances, and an object of the present invention is to provide an airbag device for a saddle-type vehicle which can restrict an airbag from being separated until the airbag is deployed so that the airbag can be separated in a deployed state.

Solution to Problem

There is provided an airbag device for a saddle-type vehicle which includes an inflator having an opening, and an airbag that is connected to an inside of the inflator through the opening and is deployed with a gas released by the inflator, the airbag device including: a first restriction portion that restricts separation between the inflator and the airbag when the airbag is deployed. The first restriction portion has an elastic member positioned inside the inflator. When the inflator releases a gas having a predetermined first gas release pressure, the elastic member is increased in diameter due to the gas pressure of the inflator, and the inflator and the elastic member enter a locked state, so that the first restriction portion restricts separation of the airbag. When the inflator releases a gas having a predetermined second gas release pressure lower than the first gas release pressure after the gas having the first gas release pressure is released, the elastic member is decreased to have a diameter smaller than the diameter in the locked state, and the locked state is canceled, so that the first restriction portion cancels restriction on separation of the airbag.

Advantageous Effects of Invention

It is possible to provide an airbag device for a saddle-type vehicle which can restrict an airbag from being separated until the airbag is deployed so that the airbag can be separated in a deployed state.

DESCRIPTION OF EMBODIMENTS

Hereinafter, embodiments of the present invention will be described with reference to the drawings. In the description, directions such as front, rear, right, left, up, and down are identical to directions with respect to the vehicle body, unless otherwise specified. In addition, reference sign FR in each drawing indicates the front side of the vehicle body, reference sign UP indicates the upper side of the vehicle body, and reference sign LH indicates the left side of the vehicle body.

Embodiments

Figure 1:
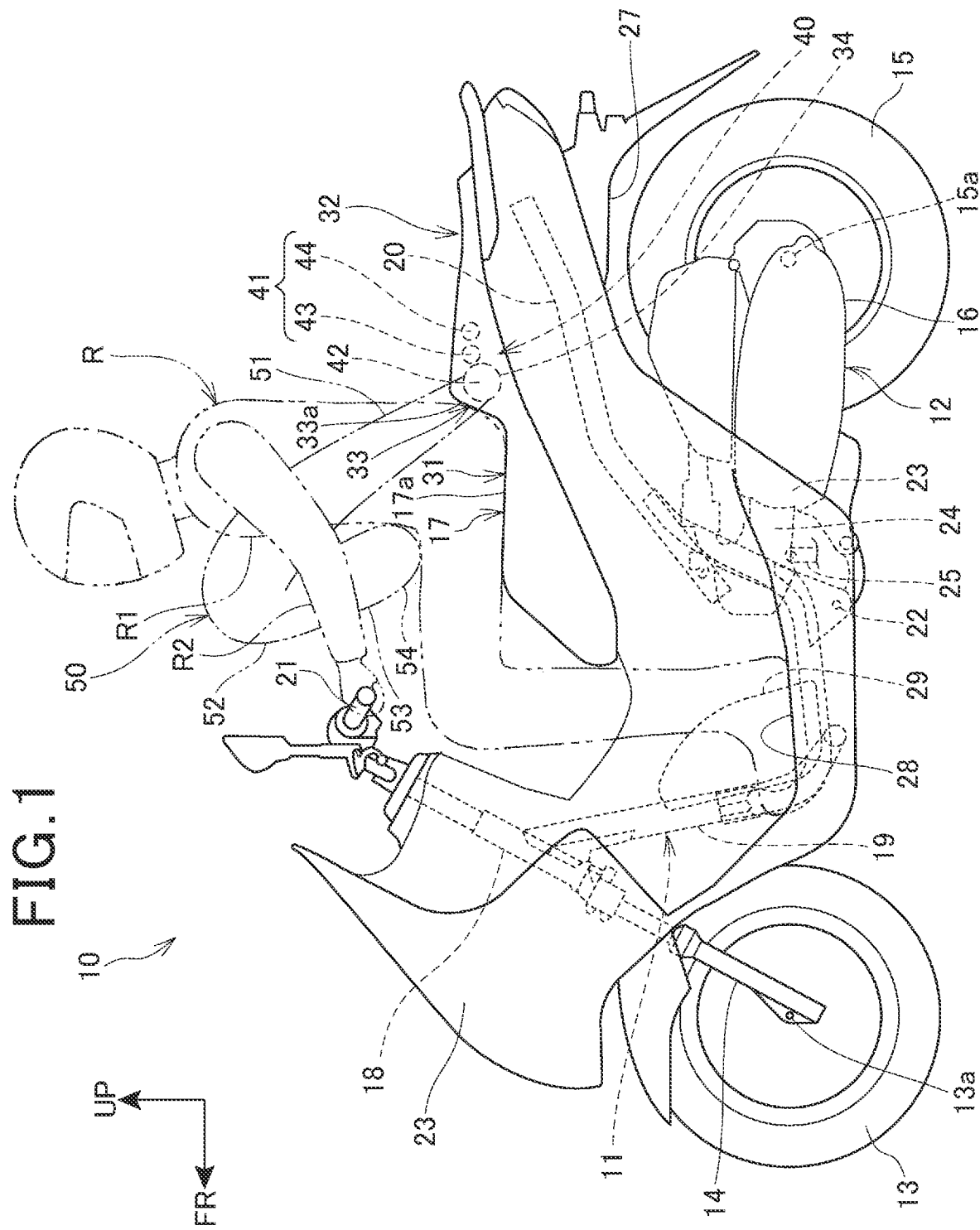
FIG. 1 is a side view of a saddle-type vehicle according to an embodiment of the present invention.

FIG. 1 is a side view of a saddle-type vehicle 10 according to an embodiment of the present invention.

The saddle-type vehicle 10 is a vehicle including: a vehicle body frame 11; a power unit 12, which is supported by the vehicle body frame 11; a front fork 14, which supports a front wheel 13 to be steerable; a swing arm 16, which supports a rear wheel 15; and a seat 17 for an occupant.

The saddle-type vehicle 10 is a vehicle on which an occupant sits to straddle the seat 17. The seat 17 is provided above a rear part of the vehicle body frame 11.

The vehicle body frame 11 includes: a head pipe 18 provided in a front end portion of the vehicle body frame 11; a front frame 19 located on a rear side of the head pipe 18; and a rear frame 20 located on a rear side of the front frame 19. The front end portion of the front frame 19 is connected with the head pipe 18.

The seat 17 is supported by the rear frame 20.

The front fork 14 is supported to be steerable to the left and right by the head pipe 18. The front wheel 13 is supported by an axle 13a, which is provided at a lower end portion of the front fork 14. A handlebar 21 to be gripped by an occupant is attached to an upper end portion of the front fork 14.

The swing arm 16 is supported by a pivot shaft 22, which is supported by the vehicle body frame 11. The pivot shaft 22 is a shaft extending horizontally in a vehicle width direction. The pivot shaft 22 is inserted through a front end portion of the swing arm 16. The swing arm 16 swings up and down with the pivot shaft 22 as the center. The rear wheel 15 is supported by an axle 15a, which is provided at a rear end portion of the swing arm 16.

The power unit 12 is disposed between the front wheel 13 and the rear wheel 15, and is supported by the vehicle body frame 11.

The power unit 12 is an internal combustion engine. The power unit 12 includes: a crankcase 23; and a cylinder unit 24 which houses a reciprocating piston. An exhaust device 25 is connected with an exhaust port of the cylinder unit 24.

An output of the power unit 12 is transmitted to the rear wheel 15 by a driving force transmission member that connects the power unit 12 and the rear wheel 15.

The saddle-type vehicle 10 also includes: a front fender 26, which covers the front wheel 13 from above; a rear fender 27, which covers the rear wheel 15 from above; a step 28 on which the occupant places his/her foot; and a fuel tank 29, which stores fuel to be used by the power unit 12.

The front fender 26 is attached to the front fork 14. The rear fender 27 and the step 28 are each provided below the seat 17. The fuel tank 29 is supported by the vehicle body frame 11.

The saddle-type vehicle 10 is a scooter-type motorcycle including a floor step 28 in front of and below the seat 17. The power unit 12 is a unit swing engine in which the internal combustion engine and the swing arm 16 are integrally formed. The power unit 12 is disposed immediately below the seat 17 and the rear frame 20. The saddle-type vehicle 10 also includes a vehicle body cover 30 covering the vehicle body such as the vehicle body frame 11 and the power unit 12.

The seat 17 is provided behind the handlebar 21 and above the rear frame 20. The seat 17 includes a front seat 31 on which a driver R (occupant) sits and a rear seat 32 disposed behind the front seat 31. The rear seat 32 has a stepped shape higher than the front seat 31. A passenger can sit on the rear seat 32, or luggage can be put on the rear seat 32.

The saddle-type vehicle 10 includes an airbag device 40 that protects the driver R. The airbag device 40 is a rear part of the seat 17 and is disposed behind the front seat 31.

Specifically, the airbag device 40 is accommodated in an airbag accommodating portion 34 provided inside a front portion of the rear seat 32. The airbag device 40 is disposed behind a seating position 17a of the driver R on the seat 17.

Figure 2:
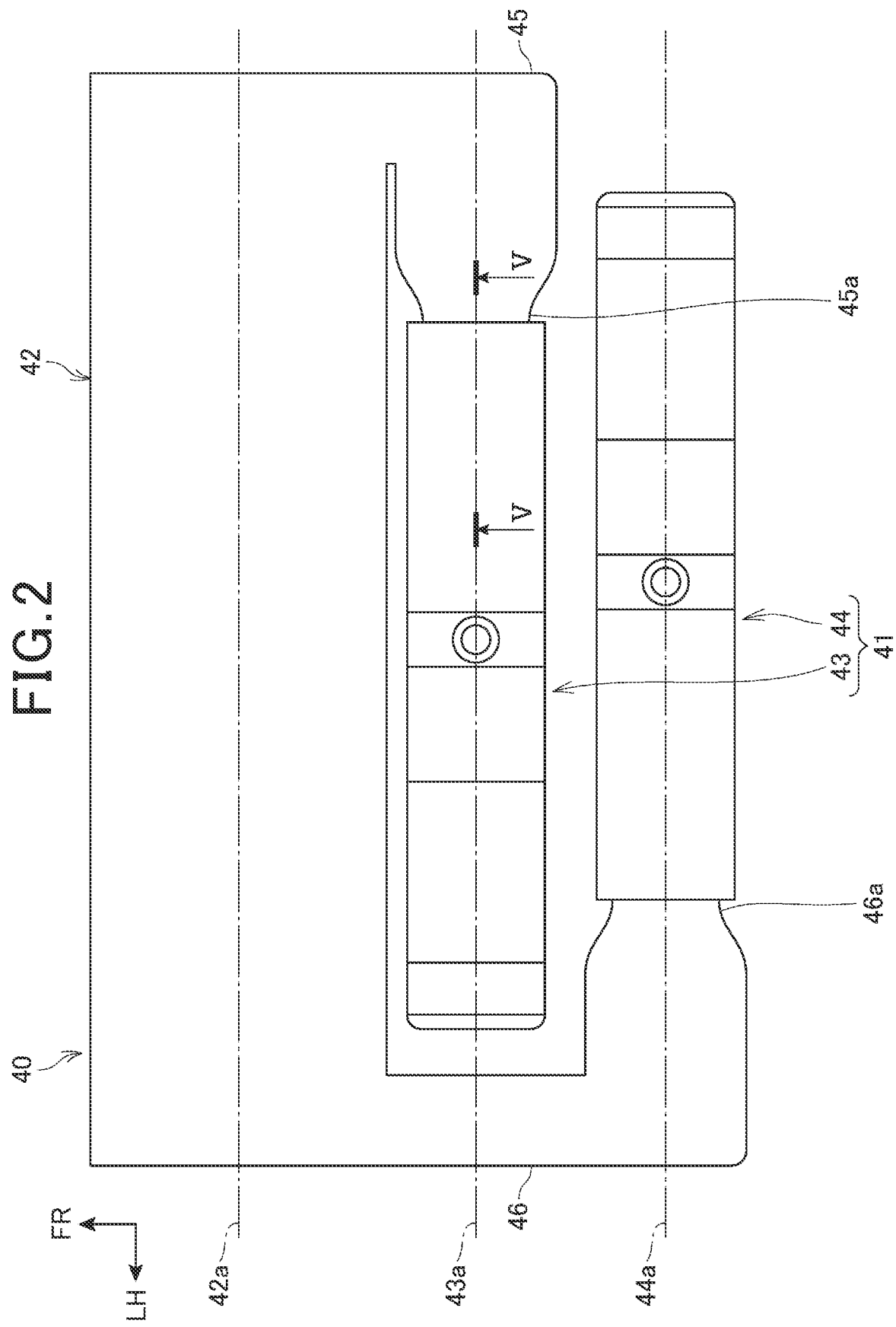
FIG. 2 is a plan view of an airbag device from above.

FIG. 2 is a plan view of the airbag device 40 from above.

The airbag device 40 includes an inflator 41 and an airbag 42 deployed by a gas released from the inflator 41.

The inflator 41 of the present embodiment includes a first inflator 43 and a second inflator 44.

The first inflator 43 and the second inflator 44 have respective rod shapes extending in a vehicle width direction and are disposed to orient respective axial lines 43a and 44a of the rod shapes in the vehicle width direction.

The first inflator 43 is disposed behind the airbag 42 in the rear seat 32. The second inflator 44 is disposed behind the first inflator 43 in the rear seat 32. The second inflator 44 is disposed substantially parallel to the first inflator 43. The first inflator 43 and the second inflator 44 are fixed to a seat bottom plate of the seat 17.

The airbag 42 is connected to one end portion of the first inflator 43 in the axial direction. The airbag 42 is connected to one end portion of the second inflator 44 in the axial direction. The first inflator 43 is disposed such that the airbag 42 is connected to the one end (right end) in the vehicle width direction. The second inflator 44 is disposed such that the airbag 42 is connected to a connection portion 44b at the other end (left end) in the vehicle width direction.

The airbag 42 is accommodated in a folded roll shape behind a step portion 33 in the seat 17. The airbag 42 is disposed such that an axial line 42a of the roll shape is oriented in the vehicle width direction. The airbag 42 is disposed immediately behind a front surface 33a of the step portion 33.

The airbag 42 is disposed in front of the first inflator 43 substantially in parallel with the first inflator 43. The airbag 42 is disposed on the seat bottom plate of the seat 17.

The airbag 42, in the folded roll shape, includes an extension portion 45 extending rearward from one end portion in the vehicle width direction and connected with the first inflator 43, and an extension portion 46 extending rearward from the other end portion in the vehicle width direction and connected with the second inflator 44.

An airbag-side connection portion 45a connected to the first inflator 43 is provided at an end portion of the extension portion 45.

An airbag-side connection portion 46a connected to the second inflator 44 is provided at an end portion of the extension portion 46.

The gas released from the first inflator 43 flows into the airbag 42 through the extension portion 45. The gas released from the second inflator 44 flows into the airbag 42 through the extension portion 46.

The saddle-type vehicle 10 includes an acceleration sensor (not illustrated) that detects impact acting on the saddle-type vehicle 10. This acceleration sensor is electrically connected with a control unit (not illustrated) of the saddle-type vehicle 10, and the control unit is electrically connected with the inflator 41. The control unit determines the actuation or non-actuation of the airbag device 40, based on the detected acceleration. In actuating the airbag device 40, the control unit actuates the inflator 41 to release the gas into the airbag 42. The airbag 42 is inflated and deployed by the pressure of the gas. When the airbag 42 is inflated, the airbag 42 pushes out a cover (not illustrated) covering the airbag accommodating portion 34 from above and is deployed upward. The control unit includes a processor, a memory, and the like.

Figure 3:
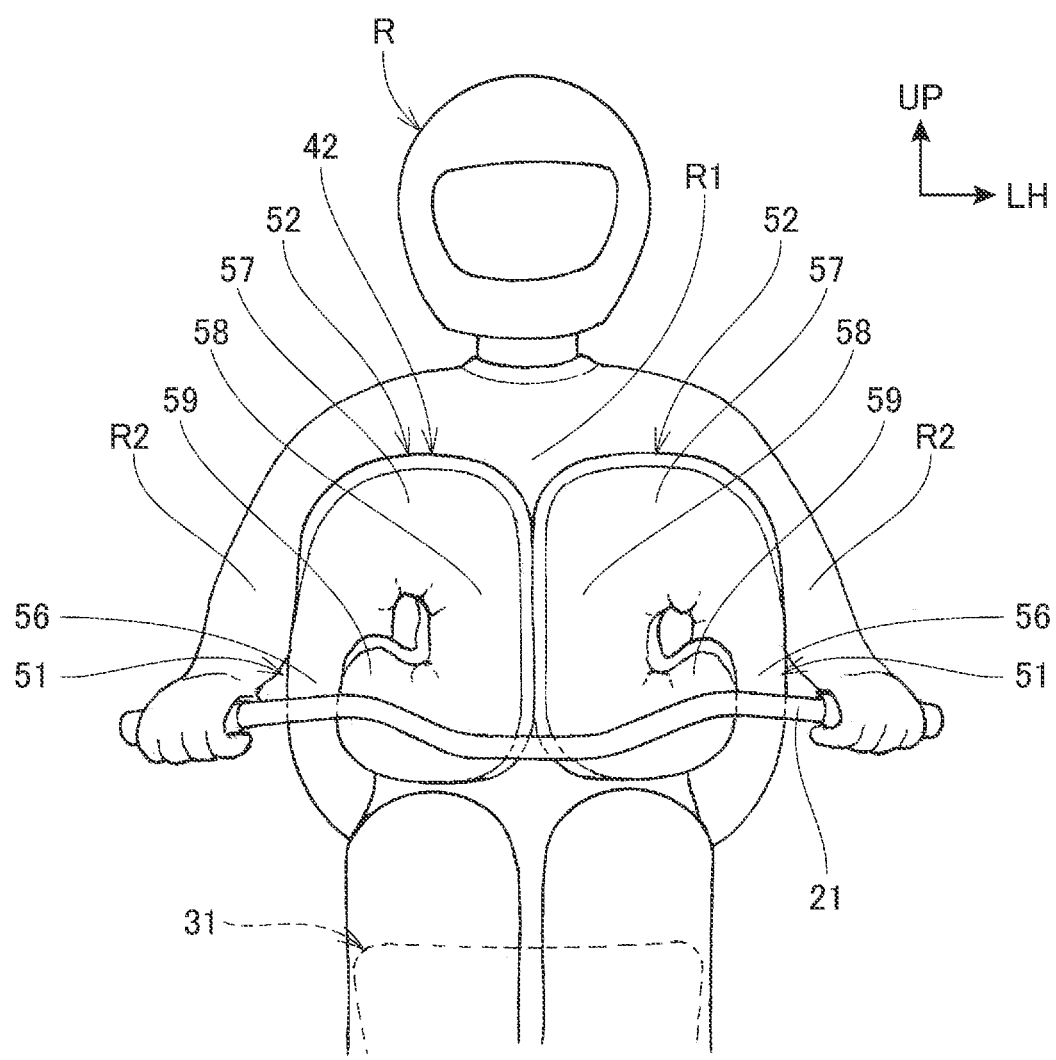
FIG. 3 is a front view illustrating a state where an airbag 42 of the first embodiment is deployed.

FIG. 3 is a front view illustrating a state where the airbag 42 of the present embodiment is deployed.

As illustrated in FIG. 1 or 3, the airbag 42 is deployed forward and upward from the step portion 33 of the seat 17.

On the front surface 33a of the step portion 33, an opening portion, through which the inflating airbag 42 passes, is formed in conjunction with the inflation of the airbag 42. This opening portion is formed, for example, by a fragile portion provided on the front surface 33a of the step portion 33 being cleaved by the inflating airbag 42. The airbag 42 is deployed forward and upward from the front surface 33a of the step portion 33.

The airbag 42 includes a forward deployment portion 51 extending forward and upward from the step portion 33, and an inward deployment portion 52 to be deployed inward in the vehicle width direction from a front end portion of the forward deployment portion 51. A pair of left and right forward deployment portions 51 and a pair of left and right inward deployment portions 52 are provided to be substantially left-right symmetric with respect to a center portion 42b (FIG. 6) in a width direction of the airbag 42 (in the vehicle width direction).

The forward deployment portion 51 includes a first deployment portion 55 to be deployed from the center portion in the width direction of the airbag 42 and a second deployment portion 56 to be deployed from the first deployment portion 55.

The inward deployment portion 52 includes a third deployment portion 57 to be deployed from the second deployment portion 56, a fourth deployment portion 58 to be deployed from the third deployment portion 57, and a fifth deployment portion 59 to be deployed from the fourth deployment portion 58.

When the gas is released from the first inflator 43 and the second inflator 44, the left and right first deployment portions 55 are deployed outward in the vehicle width direction from the step portion 33. Then, the airbag 42 is deployed successively in order from the second deployment portions 56 to the fifth deployment portions 59.

The first deployment portions 55 extend in the vehicle width direction on a rear upper side of the front seat 31 and cover a lower part of a trunk R1 of the driver R from a rear side.

The left and right second deployment portions 56 are deployed obliquely forward and upward from the step portion 33, in the vehicle side view. The left and right second deployment portions 56 are respectively deployed forward and upward passing between the trunk R1 of the driver R and the arms R2 of the driver R, who grips the handlebar 21 and is seated on the front seat 31. Specifically, the left and right forward deployment portions 51 are respectively deployed from below the arms R2 of the driver R gripping the handlebar 21 to upper sides of the arms R2 passing through the inner sides of the arms R2 in the vehicle width direction.

The left and right second deployment portions 56 are deployed to positions on a front side of the trunk R1 of the driver R. The left and right second deployment portions 56 cover the trunk R1 of the driver R from the outside in the vehicle width direction. The left and right third deployment portions 57 extend in the vehicle width direction on the front side of the trunk R1 of the driver R and cover the trunk R1 from the front side.

The left and right fourth deployment portions 58 extend in an up-and-down direction on the front side of the trunk R1 and cover the trunk R1 from the front side. The left and right fifth deployment portions 59 both extend in the vehicle width direction below the third deployment portions 57 on the front side of the trunk R1 and cover the trunk R1 from the front side.

Figure 4:
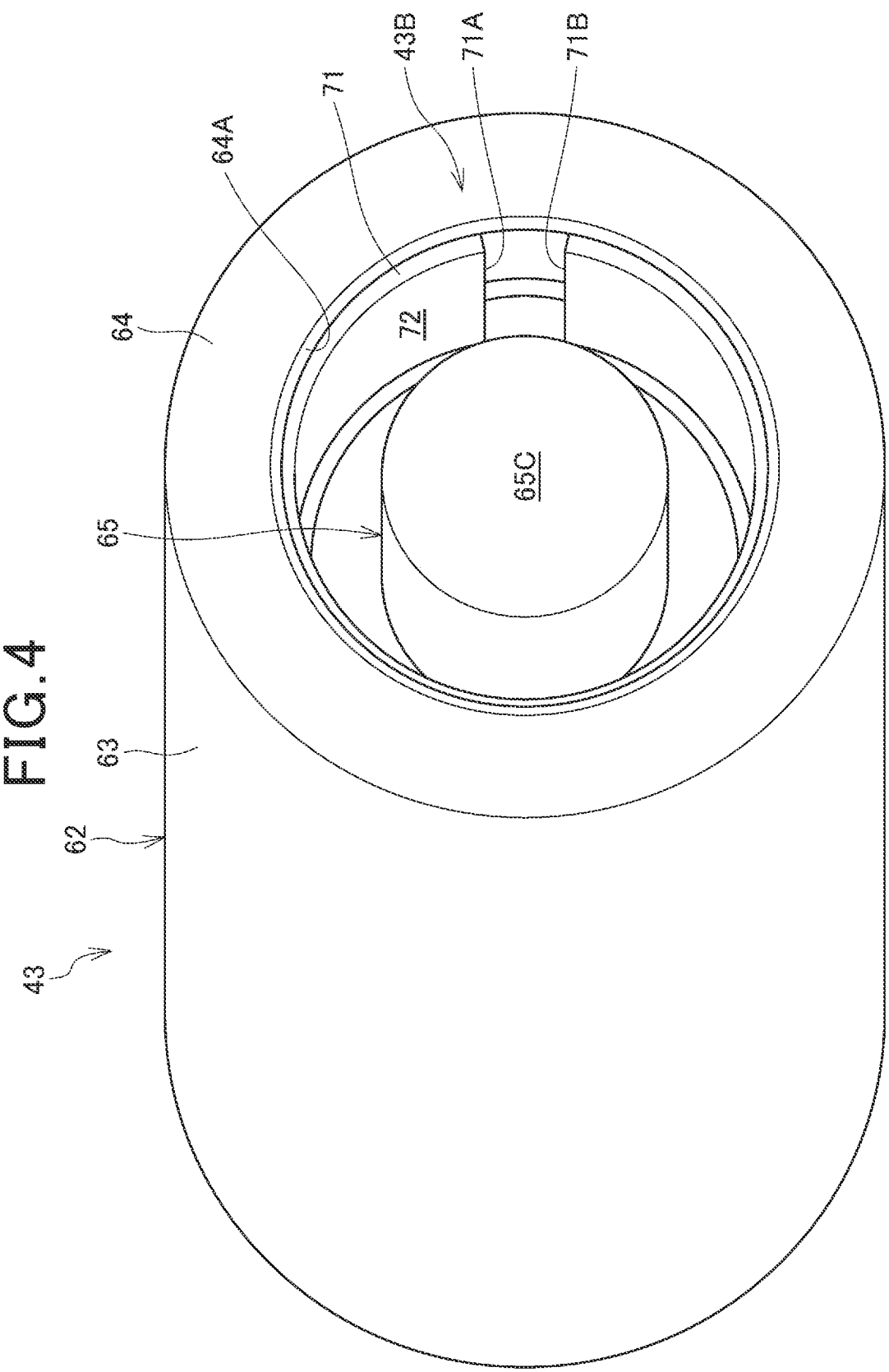
FIG. 4 is a perspective view of an inflator of an airbag device of a first embodiment.
Figure 5:
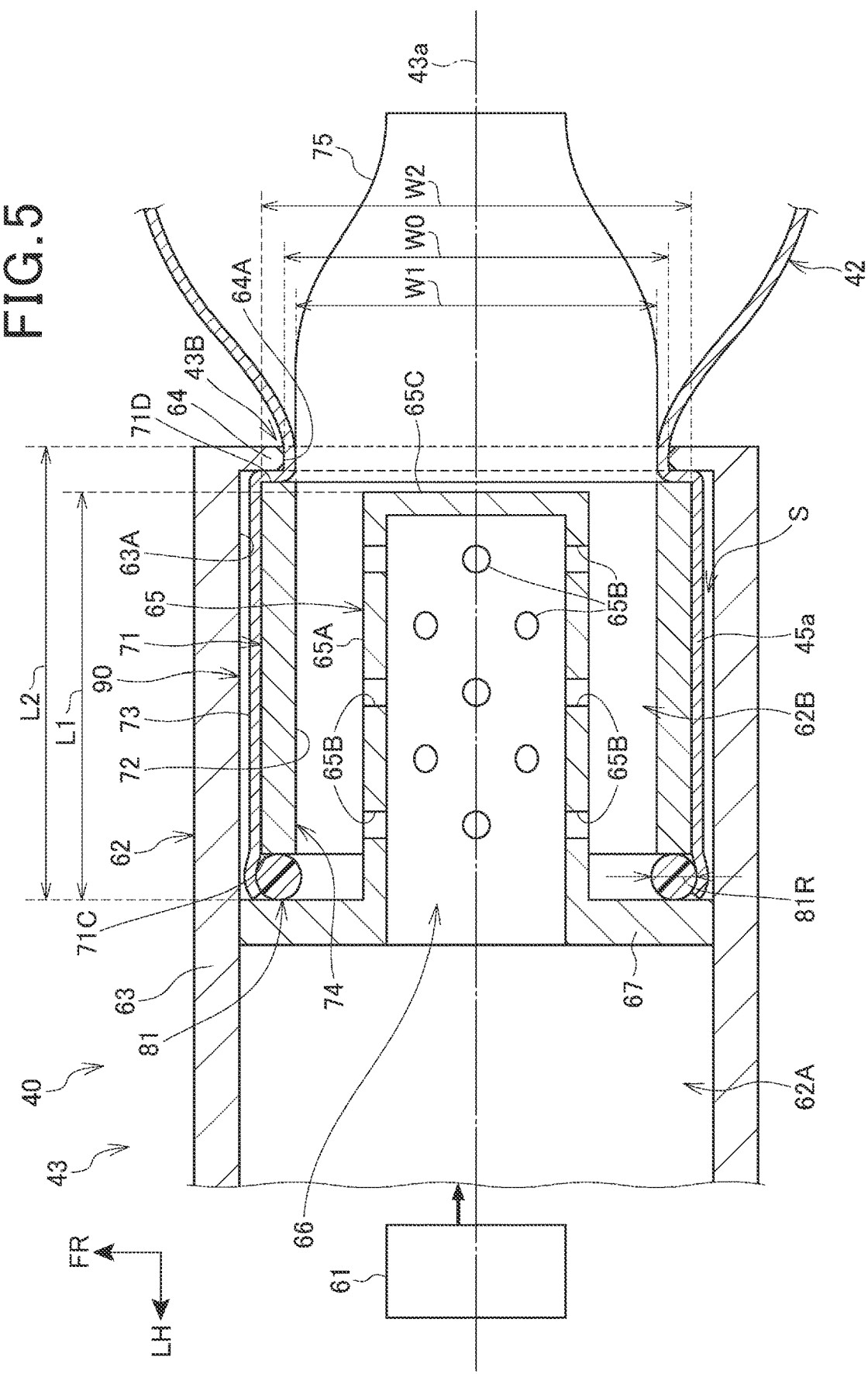
FIG. 5 is a sectional view along an axial line of the inflator of the airbag device of the first embodiment.

FIG. 4 is a perspective view of the inflator 43 of the airbag device 40 of a first embodiment. FIG. 5 is a sectional view along the axial line 43a of the inflator 43 of the airbag device 40 of the first embodiment.

Basic structures of the first inflator 43 and the second inflator 44 are the same. Specifically, the first inflator 43 differs from the second inflator 44 in that the airbag-side connection portion 45a of the airbag 42 is connected to the first inflator 43, but the airbag-side connection portion 46a of the airbag 42 is connected to the second inflator 44. However, the connection of the airbag-side connection portion 46a to the second inflator 44 is similar to the connection of the airbag-side connection portion 45a to the first inflator 43. Hence, the first inflator 43 will be described below. In the present embodiment, the first inflator 43 and the second inflator 44 are also referred to as inflators 43 and 44.

The inflator 43 includes an inflator main body 61 having a gas release source and a housing 62 which houses the inflator main body 61. The inflator main body 61 includes an electric ignition system, a firelighter, a nitrogen gas generating agent, or the like. When the inflator main body 61 is actuated under control of a control unit (not illustrated), a gas is released from the inflator main body 61 into the housing 62.

The housing 62 has an outer circumferential wall 63. The outer circumferential wall 63 is formed in a cylindrical shape extending in the axial direction (the direction in which the axial line 43a extends, and the same applies to the following description). The outer circumferential wall 63 of the present embodiment is formed in a circular-cylindrical shape. Here, the cylinder is used to mean a circular cylinder or a square cylinder. Specifically, the outer circumferential wall 63 of the present embodiment has a circular-cylindrical shape as an example of the cylindrical shape, but the outer circumferential wall 63 may have a polygonal-cylindrical shape such as a hexagonal-cylindrical shape or an octagonal-cylindrical shape.

A locking portion 64 is formed at one end (right end) of the outer circumferential wall 63 in the axial direction. The locking portion 64 has an annular plate shape. In other words, the inflator 43 includes an opening portion 43B on one end side (right end side) of the cylindrical outer circumferential wall 63, and the opening portion 43B has the locking portion 64. A circular opening 64A is formed by an inner circumferential edge of the locking portion 64. The airbag 42 is introduced into the housing 62, that is, into the outer circumferential wall 63, through the opening 64A.

A gas ejection unit 65 extending in the axial direction is provided inside the outer circumferential wall 63. The gas ejection unit 65 includes a hollow gas ejection passage 66 therein. In the present embodiment, the gas ejection unit 65 is formed in a circular-cylindrical shape as an example of the cylindrical shape. The gas ejection unit 65 is disposed concentrically with the outer circumferential wall 63. An outer diameter of the gas ejection unit 65 is formed to be smaller than an inner diameter W0 of the opening 64A. The gas ejection unit 65 is positioned inside the housing 62 in the axial direction. Specifically, regarding a length from a fixing portion 67 in the axial direction, a length L1 of the gas ejection unit 65 is shorter than a length L2 of the housing 62. Hence, the length L1 of the gas ejection unit 65 can be set to a suitable and sufficient length.

A disk-shaped closing portion 65C is formed at one end portion of the gas ejection unit 65 in the axial direction. The closing portion 65C closes one end side of the gas ejection passage 66 in the axial direction. The flange-shaped fixing portion 67 is formed at the other end portion (left end portion) of the gas ejection unit 65 in the axial direction. The fixing portion 67 is fixed to an inner circumferential surface 63A of the outer circumferential wall 63. The gas ejection unit 65 and the fixing portion 67 partition the inside of the housing 62 into a gas release chamber 62A on the inflator main body 61 side and a gas ejection chamber 62B on the opening 64A side. The gas release chamber 62A includes the gas ejection passage 66.

A plurality of gas ejection ports 65B communicating with the gas ejection passage 66 are formed in the outer circumferential surface 65A of the gas ejection unit 65. In the present embodiment, the gas ejection ports 65B are formed at predetermined intervals in the axial direction and are formed at predetermined intervals in a circumferential direction and misaligned in the axial direction. In other words, the gas ejection ports 65B are formed in the outer circumferential surface 65A of the gas ejection unit 65 in a lattice pattern. The gas ejection port 65B is a through-hole penetrating the gas ejection unit 65 in a direction orthogonal to the axial direction, that is, in a radial direction. The gas ejection passage 66 and the gas ejection chamber 62B communicate with each other through the gas ejection ports 65B. The gas ejection ports 65B eject the gas from the gas ejection passage 66 in the radial direction.

The outer circumferential wall 63 of the housing 62 is provided on an outer side of the gas ejection unit 65 in the radial direction. Specifically, in the present embodiment, the outer circumferential wall 63 corresponds to a circumferential portion provided around the gas ejection unit 65. The gas ejection chamber 62B is formed by a space surrounded by the outer circumferential wall 63 and the gas ejection unit 65.

In the gas ejection chamber 62B, a metal plate 71 as an example of an elastic member is disposed. The metal plate 71 extends in the axial direction. The metal plate 71 is formed to have a C-shaped cross section. In other words, the metal plate 71 has a shape in which a part of a side surface of a circular cylinder is cut along the axial direction. The metal plate 71 has an inner circumferential surface 72 and an outer circumferential surface 73. The metal plate 71 is disposed to surround the gas ejection unit 65. The metal plate 71 is disposed to overlap the gas ejection port 65B in the axial direction. Specifically, the metal plate 71 is disposed to have an overlapping portion 74 which overlaps the gas ejection port 65B in the axial direction. In the present embodiment, the overlapping portion 74 completely overlaps the gas ejection port 65B in the axial direction.

As illustrated in FIG. 4, the metal plate 71 has one end 71A and the other end 71B in a circumferential direction thereof. The metal plate 71 is elastically deformable such that the one end 71A and the other end 71B are separated from each other. The metal plate 71 is configured to be elastically deformable to increase a diameter, that is, a distance from the axial line 43a to the inner circumferential surface 72.

In addition, the metal plate 71 is configured to be elastically deformable such that the one end 71A and the other end 71B approach each other or overlap each other in the circumferential direction. The metal plate 71 is configured to be elastically deformable to decrease the diameter, that is, the distance from the axial line 43a to the inner circumferential surface 72.

In a natural state (first state) in which the metal plate 71 of the present embodiment is not elastically deformed, the metal plate is configured to overlap the locking portion 64 in the radial direction and form an annular gap S in cooperation with the metal plate and the inner circumferential surface 63A of the outer circumferential wall 63. In the natural state, an outer diameter W2 of the metal plate 71 is larger than the inner diameter W0 of the opening 64A, and an inner diameter W1 of the metal plate 71 is smaller than the inner diameter W0 of the opening 64A.

The tubular airbag-side connection portion 45a is disposed in the gap S between the metal plate 71 and the outer circumferential wall 63. The airbag-side connection portion 45a is an upstream end portion of the airbag 42 in a gas inflow direction. The metal plate 71 is disposed inside the airbag-side connection portion 45a, and thereby the airbag-side connection portion 45a which is a part of the airbag 42 is disposed in the gap S between the metal plate 71 and the outer circumferential wall 63 in the radial direction.

When the airbag-side connection portion 45a is expanded in the radial direction, a diameter of the cylindrical shape is larger than the outer diameter W2 of the metal plate 71. A length of an outer circumferential surface of the airbag-side connection portion 45a in the circumferential direction is equal to or longer than a length of the inner circumferential surface 63A of the outer circumferential wall 63 in the circumferential direction. Specifically, the airbag-side connection portion 45a is expanded, and thereby the airbag-side connection portion 45a can be brought into contact with the entire circumference of the inner circumferential surface 63A of the outer circumferential wall 63.

The airbag-side connection portion 45a extends upstream of an inner end portion 71C of the metal plate 71 in the axial direction in the inflator 43, that is, to the inflator main body 61 side. An O-ring 81 as an example of a second restriction portion is provided at an upstream end of the airbag-side connection portion 45a. The O-ring 81 restricts separation of the airbag 42 from the inflator 43 in a state before gas release, that is, in a normal state before the inflator main body 61 of the inflator 43 is actuated. In other words, the airbag 42 is locked to the inflator 43.

Specifically, the O-ring 81 is positioned closer to the inflator main body 61 than the inner end portion 71C of the metal plate 71 in the axial direction.

An outer diameter of the O-ring 81 is larger than the outer diameter W2 of the metal plate 71. A diameter 81R of a cross section of the O-ring 81 is larger than the gap S between the outer circumferential wall 63 and the metal plate 71 in the natural state in the radial direction. Consequently, the O-ring 81 cannot enter the gap S between the metal plate 71 and the outer circumferential wall 63. Hence, the O-ring 81 is held on the inner end portion 71C side of the metal plate 71. The O-ring 81 normally functions as a stopper for the airbag 42. The O-ring 81 normally maintains a state where the airbag 42 is connected to the inflator 43. Hence, the airbag 42 can be locked inside the inflator 43 without using an adhesive.

The O-ring 81 is made of a resin that is melted by heat when the inflator 43 releases the gas, that is, heat of the gas released from the inflator main body 61. That is, the O-ring 81 is melted by the heat of the gas until the inflator main body 61 starts releasing the gas and the inflator main body 61 finishes releasing the gas. Consequently, since the O-ring 81 is melted using an operation of the inflator main body 61 of the inflator 43, the airbag 42 can be separated from the inflator 43.

A check valve 75 is attached to the airbag 42. The check valve 75 allows gas to flow from the airbag-side connection portion 45a into the deployment portions 51 to 56 of the airbag 42 and restricts outflow of the gas from the deployment portions 51 to 56 of the airbag 42. The check valve 75 prevents the gas from escaping from the airbag 42 after the airbag is separated from the inflator 43. Hence, when the airbag 42 is separated after deployment, the inflated state and the deployed state of the airbag 42 are maintained.

Here, the inflator main body 61 of the inflator 43 releases a gas having a high gas release pressure immediately after actuation and releases a gas having a low gas release pressure as time passes.

Specifically, in a case where the inflator main body 61 is actuated, the inflator main body 61 releases a gas during a rapid increase of the gas release pressure until the gas having the maximum gas release pressure (first gas release pressure) P1 (see FIG. 7) is released. When the gas having the maximum gas release pressure P1 is released, the inflator main body 61 releases the gas while lowering the gas release pressure. The inflator main body 61 releases a gas having a deployment gas release pressure (second gas release pressure) P2 (see FIG. 8) lower than the maximum gas release pressure by a predetermined gas pressure, then releases a predetermined amount of gas, and ends the release of the gas.

The maximum gas release pressure P1 is the maximum gas release pressure of the inflator main body 61 determined by the performance of the inflator main body 61.

In addition, the deployment gas release pressure P2 is a gas pressure after gas release at the maximum gas release pressure P1 and is a gas pressure lower than the maximum gas release pressure P1. The present embodiment has a configuration in which the deployment portions 51 to 56 of the airbag 42 are deployed when the inflator main body 61 releases the gas having the deployed gas release pressure P2. In addition, in the configuration, in the case of release at the deployment gas release pressure P2, a locked state of the outer circumferential wall 63 and the metal plate 71 is canceled.

The metal plate 71 is configured to be deformable into an increased diameter state (second state) in which the diameter of the metal plate is increased to be larger than that in the natural state by the gas having the maximum gas release pressure P1, and an increased diameter state where the outer circumferential wall 63 of the inflator 43 and the metal plate 71 enter the locked state. In the present embodiment, the locked state means a state where the metal plate 71 is brought into strongly pressed contact with the inner circumferential surface 63A of the outer circumferential wall 63.

In addition, the metal plate 71 is configured to be deformable by the gas having the deployment gas release pressure P2 into an unlocked state (third state) in which the diameter of the metal plate is decreased to be smaller than in the increased diameter state and an unlocked state where the locked state is canceled. The unlocked state means a state where the metal plate 71 does not come into pressed contact with the inner circumferential surface 63A of the outer circumferential wall 63. The unlocked state may be a natural state.

The airbag device 40 of the present embodiment includes a first restriction portion 90. The first restriction portion 90 restricts separation between the inflator 43 and the airbag 42 when the airbag 42 is deployed. The first restriction portion 90 includes the metal plate 71 positioned inside the housing 62 of the inflator 43. The first restriction portion 90 moves the metal plate 71 between the increased diameter state and the unlocked state by using the pressure of the gas released from the inflator main body 61 of the inflator 43.

The first restriction portion 90 restricts the airbag 42 from being separated by deforming the metal plate 71 to the increased diameter state by the pressure of the gas released by the inflator main body 61 in a predetermined first gas release period including the time of release at the maximum gas release pressure P1. In addition, after a first gas release period passes, the first restriction portion 90 deforms, in the second gas release period after the gas having the deployment gas release pressure P2 is released, the metal plate 71 to the unlocked state by a pressure of a gas released by the inflator main body 61 lower than a pressure of a gas released in the first gas release period, and thereby the restriction on the separation of the airbag 42 is canceled.

Figure 6:
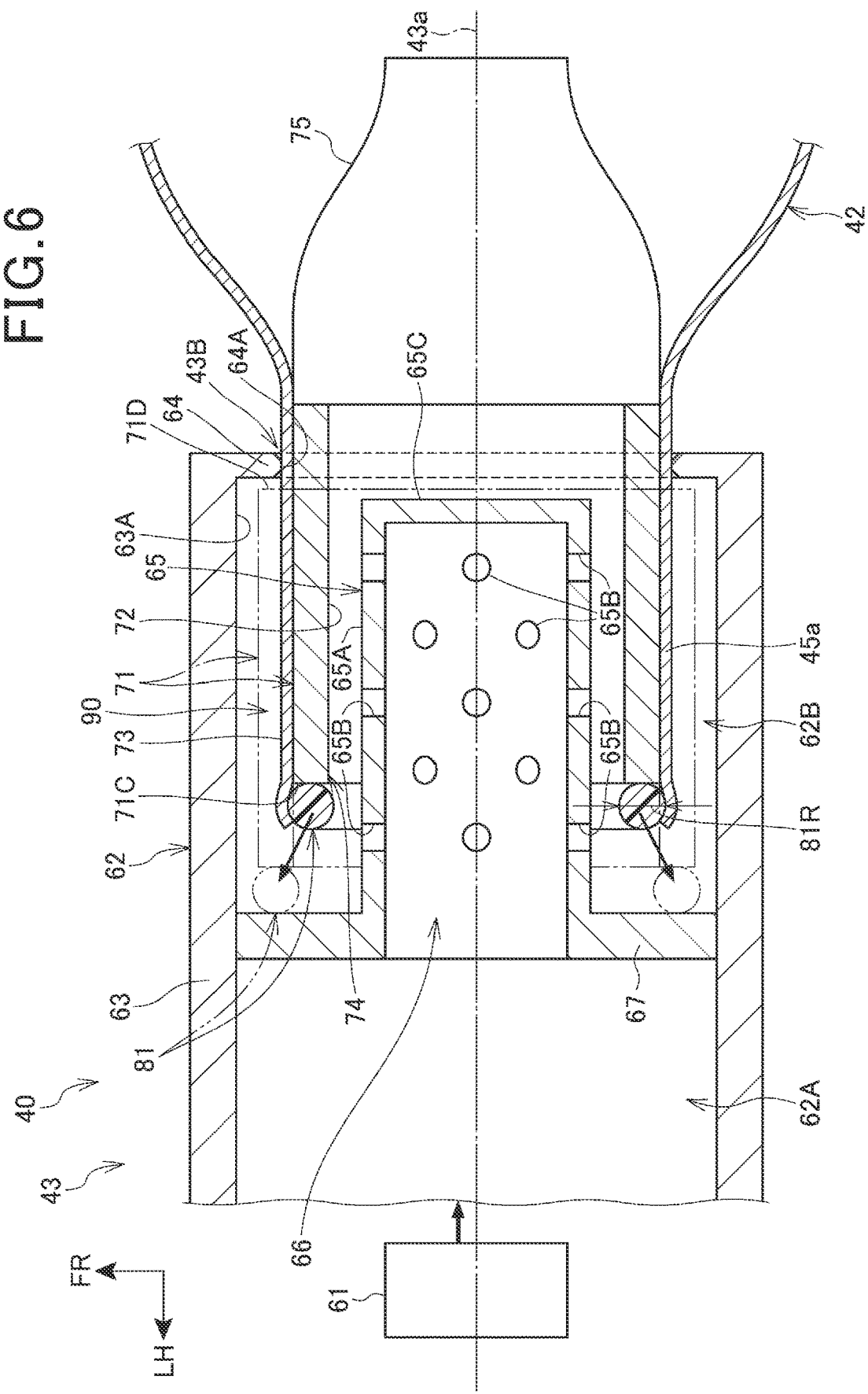
FIG. 6 is a view illustrating an example of a connection method for connecting an airbag to the inflator of the first embodiment.

FIG. 6 is a view illustrating an example of a connection method for connecting the airbag 42 to the inflator 43 of the first embodiment.

The O-ring 81 is fixed to the upstream end of the airbag-side connection portion 45a. The metal plate 71 having a decreased diameter is inserted from the opening at the center of the O-ring 81, and the metal plate 71 is disposed inside the airbag-side connection portion 45a. The O-ring 81, the metal plate 71, and the airbag-side connection portion 45a are introduced from the opening 64A of the inflator 43 into the gas ejection chamber 62B in the decreased diameter state.

At this time, the O-ring 81 is fitted into the gas ejection unit 65. In addition, the metal plate 71 is disposed around the gas ejection unit 65. The O-ring 81 is positioned closer to the gas release chamber 62A side than the inner end portion 71C of the metal plate 71 in the axial direction. The metal plate 71 is in a natural state.

As a result, the metal plate 71 in the natural state is caught by the locking portion 64, and the metal plate 71 is restricted from being detached from the gas ejection chamber 62B. In addition, the O-ring 81 is caught by the inner end portion 71C of the metal plate 71 in the natural state, and the airbag 42 is restricted from being detached from the gas ejection chamber 62B in the normal state. Specifically, the airbag 42 is connected to the inside of the inflator 43.

Figure 7:
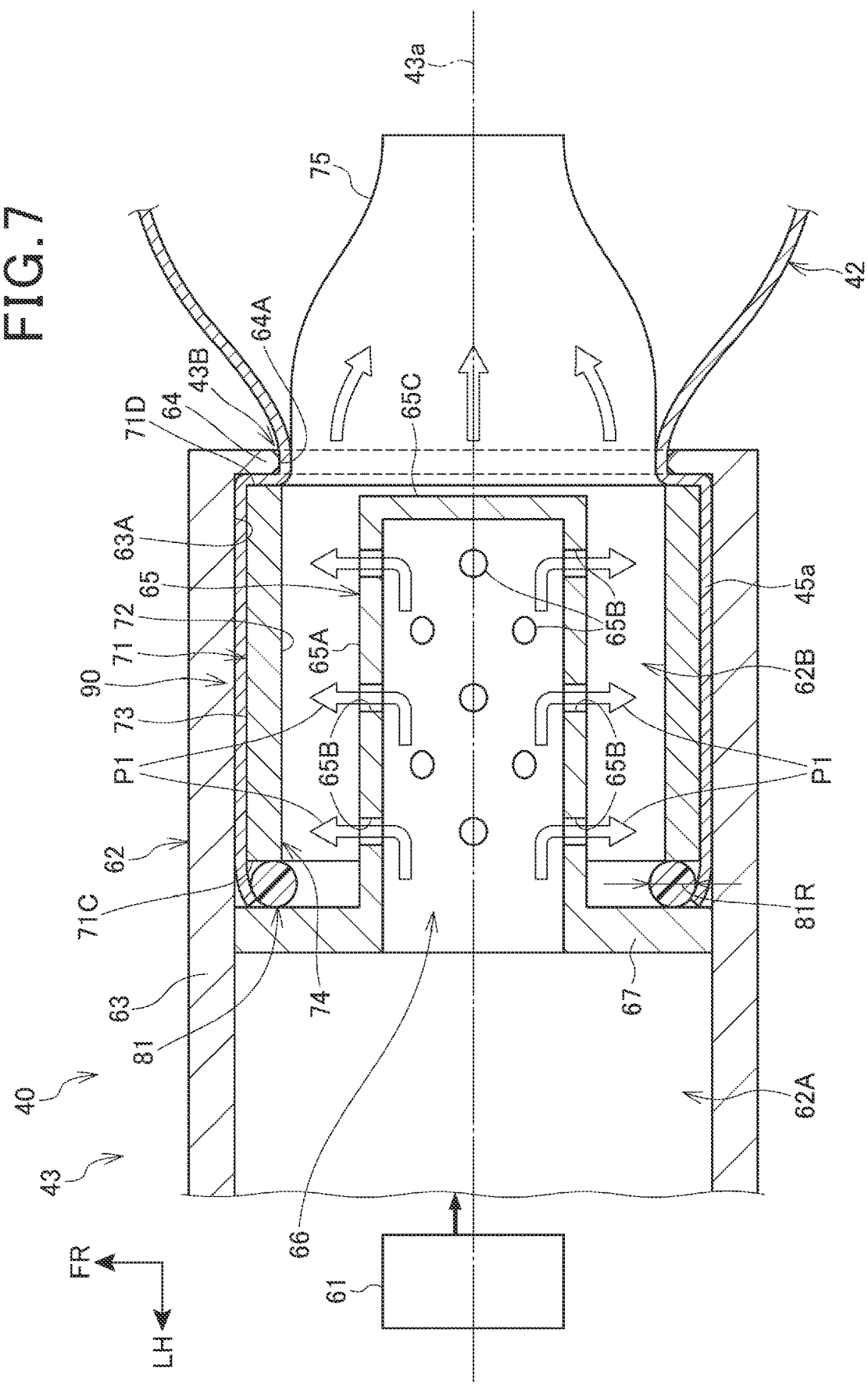
FIG. 7 is a view illustrating an operation of a first restriction portion in a case where the inflator of the first embodiment releases a gas having a maximum gas release pressure.
Figure 8:
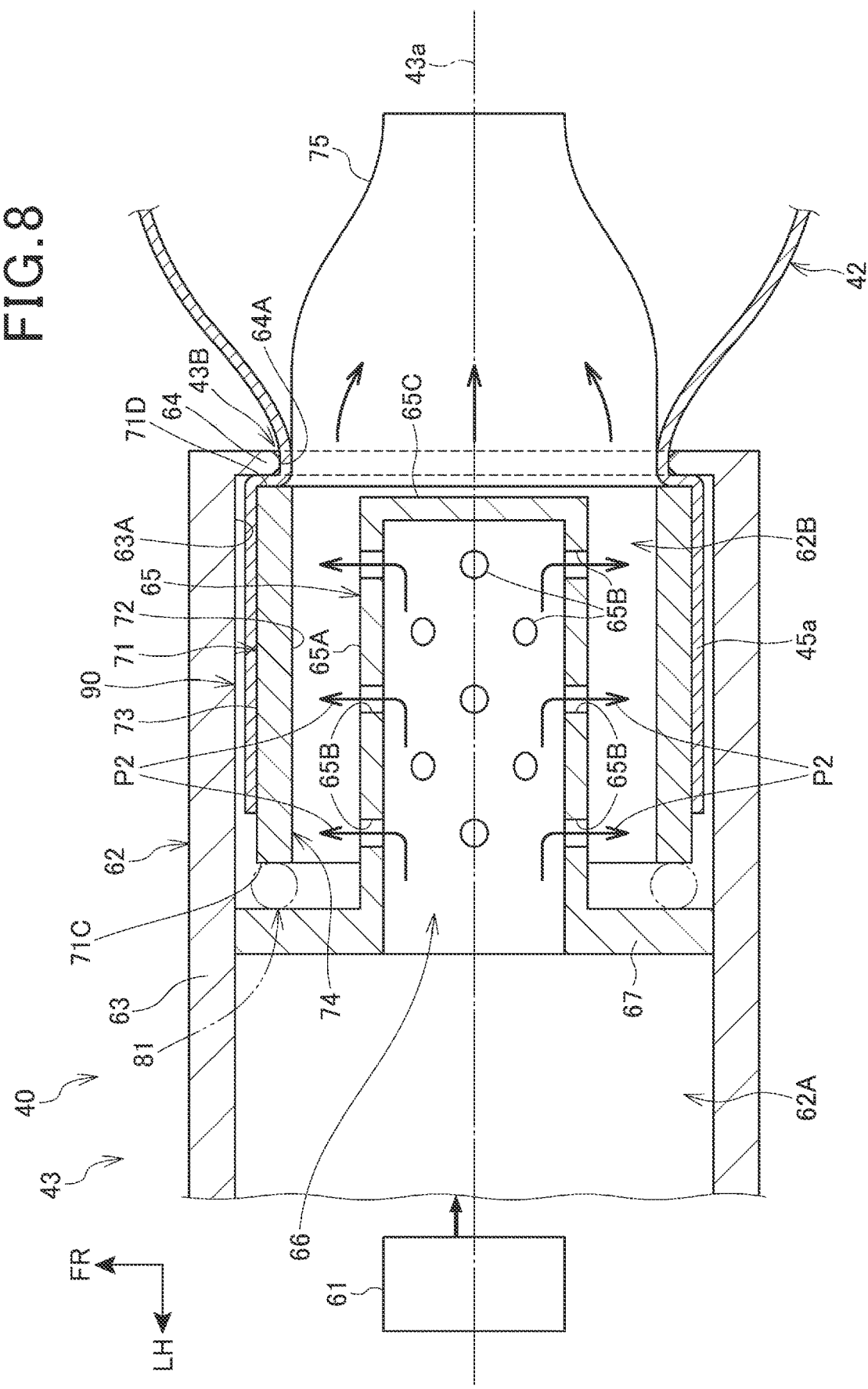
FIG. 8 is a view illustrating another operation of the first restriction portion in a case where the inflator of the first embodiment releases a gas having a deployment gas release pressure.

FIG. 7 is a view illustrating an operation of the first restriction portion 90 in the case where the inflator 43 of the first embodiment releases the gas having the maximum gas release pressure P1. FIG. 8 is a view illustrating another operation of the first restriction portion 90 in the case where the inflator 43 of the first embodiment releases the gas having the deployment gas release pressure P2.

In a case where the inflator main body 61 is actuated, the gas is released from the inflator main body 61 to the gas release chamber 62A. When the gas released into the gas release chamber 62A enters the gas ejection passage 66, the gas is ejected radially into the gas ejection chamber 62B through the gas ejection ports 65B.

The radially ejected gas is ejected toward the inner circumferential surface 72 of the metal plate 71, causes the metal plate 71 to be deformed toward the increased diameter state (second state), and is guided to the opening 64A side by the inner circumferential surface 72 of the metal plate 71. The gas guided to the opening 64A side flows into the airbag 42 through the check valve 75 to inflate the airbag 42 and deploy the airbag 42.

A force of increasing the diameter from the natural state acts on the metal plate 71 due to the gas ejected to the gas ejection chamber 62B. In particular, when the inflator main body 61 generates the maximum gas release pressure P1, a force of causing the metal plate 71 to come into strongly pressed contact with the inner circumferential surface 63A of the outer circumferential wall 63 acts on the metal plate 71. Specifically, as illustrated in FIG. 7, the airbag 42 is sandwiched between the outer circumferential surface 73 of the metal plate 71 and the inner circumferential surface 63A of the outer circumferential wall 63. Hence, even if a force to detach the airbag 42 in the axial direction acts on the airbag 42 when the airbag is deployed, the separation of the airbag 42 is restricted with clamping between the metal plate 71 and the outer circumferential wall 63.

In addition, the O-ring 81 is melted by heat of the gas released from the inflator main body 61. Hence, when the airbag 42 is deployed, the O-ring 81 is melted and loses the stopper function of the airbag 42. That is, the restriction of the O-ring 81 is canceled by the heat at the time of gas release from the inflator main body 61. The O-ring 81 can restrict the airbag 42 inside the inflator 43 in the normal state before the gas release. In addition, since the restriction of the O-ring 81 can be canceled by the gas heat for deploying the airbag 42, there is no need to provide a dedicated structure for releasing the restriction of the O-ring 81, and the configuration can be simplified.

After the inflator main body 61 releases the gas having the maximum gas release pressure P1, the gas pressure of the gas released from the inflator main body 61 is lower than the maximum gas release pressure P1. When the gas having the deployment gas release pressure P2 is released from the inflator main body 61, the airbag 42 enters a deployment state. In addition, a force received by the metal plate 71 from the gas is also weakened, and the metal plate 71 is elastically restored accordingly. At that time, since the metal plate 71 is separated from the inner circumferential surface 63A of the outer circumferential wall 63, a clamping force by the metal plate 71 and the outer circumferential wall 63 also decreases. In addition, since there is no stopper of the airbag 42, as illustrated in FIG. 8, the upstream end of the airbag-side connection portion 45a can move through the gap S and be pulled out of the inflator 43. Specifically, the airbag 42 can be separated. Since the check valve 75 is provided in the airbag 42, the deployed state of the airbag is maintained even if the airbag 42 is separated from the inflator 43.

As described above, according to the first embodiment to which the present invention is applied, the airbag device 40 for a saddle-type vehicle includes the inflator 43 having the opening 64A, and the airbag 42 that is connected to the inside of the inflator 43 through the opening 64A and is deployed with the gas emitted by the inflator 43. The airbag device 40 of a saddle-type vehicle includes the first restriction portion 90 that restricts separation between the inflator 43 and the airbag 42 when the airbag 42 is deployed. The first restriction portion 90 includes a metal plate 71 positioned inside the inflator 43.

In the airbag device 40 of a saddle-type vehicle, when the inflator 43 emits the gas having the predetermined maximum gas release pressure P1, the metal plate 71 is increased in diameter due to the gas pressure of the inflator 43, and the inflator 43 and the metal plate 71 enter the locked state, so that the first restriction portion 90 restricts separation of the airbag 42. In addition, when the inflator 43 releases the gas having the predetermined deployment gas release pressure P2 lower than the maximum gas release pressure P1 after the gas having the maximum gas release pressure P1 is released, the metal plate 71 is decreased to have a diameter smaller than the diameter in the locked state, and the locked state is canceled, so that the first restriction portion 90 cancels the restriction on separation of the airbag 42.

Consequently, the airbag 42 can be restricted inside the inflator 43 by the diameter increase of the metal plate 71, and the airbag can be separated from the inflator 43 by the diameter decrease of the metal plate 71 in the state where the airbag 42 after the gas release is deployed.

In the present embodiment, the inflator 43 includes the gas ejection unit 65 that extends in the axial direction (the direction along the axial line 43a) and that has a hollow gas ejection passage 66 inside the gas ejection unit 65. A plurality of gas ejection ports 65B communicating with the gas ejection passage 66 are formed in the outer circumferential surface 65A of the gas ejection unit 65.

Consequently, the gas ejection port 65B can be formed in a simple shape.

In addition, in the present embodiment, the metal plate 71 is disposed to have the overlapping portion 74, and at least a part of the overlapping portion overlaps the gas ejection ports 65B in the axial direction.

Consequently, the diameter of the metal plate 71 can be increased by being pushed with the gas from the inner circumferential surface 72 side.

In addition, in the present embodiment, the gas ejection unit 65 is positioned inside the inflator 43 in the axial direction.

Consequently, the length L1 of the gas ejection unit 65 can be set to the suitable and sufficient length for deploying the airbag 42.

In addition, in the present embodiment, the check valve 75 is attached to the airbag 42.

Consequently, the gas can be suppressed from escaping from the airbag 42 after the airbag is separated from the inflator 43.

In addition, in the present embodiment, the inflator 43 includes the outer circumferential wall 63 provided around the gas ejection unit 65, and a part of the airbag 42 is positioned between the outer circumferential wall 63 and the metal plate 71 in the radial direction orthogonal to the axial direction. The metal plate 71 is increased in diameter such that the airbag 42 is sandwiched between the outer circumferential wall 63 and the metal plate 71, and thereby the separation of the airbag 42 is restricted.

Consequently, the diameter increase of the metal plate 71 can result in locking the airbag 42 in the inflator 43 by the inflator 43 and the metal plate 71.

In addition, in the present embodiment, the O-ring 81 that restricts the airbag 42 from being separated from the inflator 43 in the state before the gas release is provided, and the restriction of the O-ring 81 is canceled by the heat at the time of the gas release of the inflator 43.

Consequently, the O-ring 81 can restrict the airbag 42 from being separated from the inside of the inflator 43 in the normal state before the gas release. In addition, since the restriction of the O-ring 81 can be canceled by the gas heat for deploying the airbag 42, there is no need to provide a dedicated structure for canceling the restriction of the O-ring 81.

In addition, in the present embodiment, the O-ring 81 is provided at the airbag 42 and is positioned upstream in the inflator 43, that is, upstream of the inner end portion 71C of the metal plate 71 positioned upstream in the inflator 43, and has the diameter 81R larger than the gap S between the outer circumferential wall 63 and the metal plate 71 in the radial direction.

Consequently, the airbag 42 can be locked inside the inflator 43 without using an adhesive.

In addition, in the present embodiment, the O-ring 81 is melted by the heat at the time of the gas release of the inflator 43.

Consequently, after the restriction of the separation by the metal plate 71, the O-ring 81 is melted, so that the airbag 42 can be separated from the inflator 43.

Second Embodiment

A second embodiment to which the present invention is applied will be described. In the second embodiment, parts configured in the same manner as in the first embodiment are denoted by the same reference numerals and will not be described.

Figure 9:
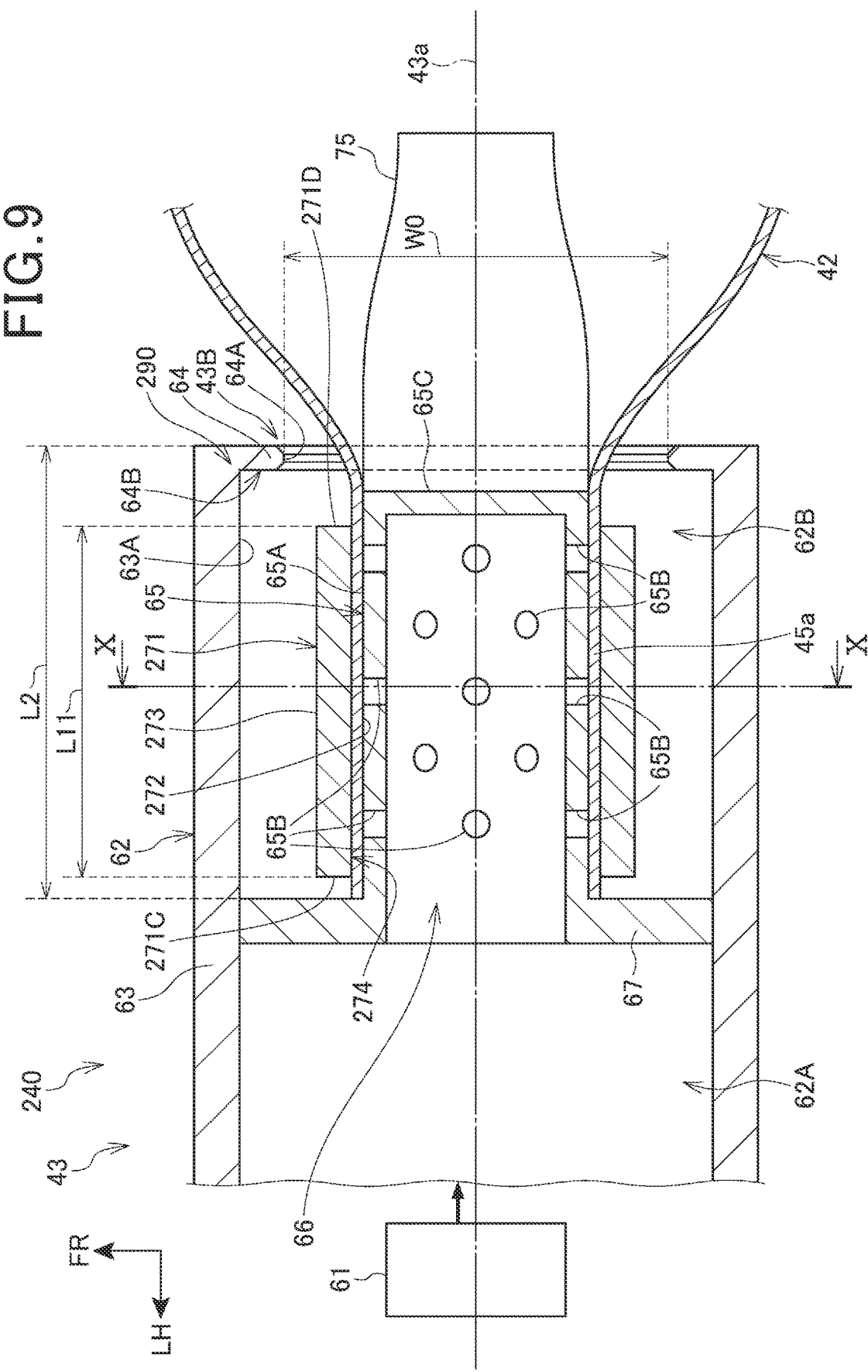
FIG. 9 is a sectional view of an inflator of an airbag device of a second embodiment.
Figure 10:
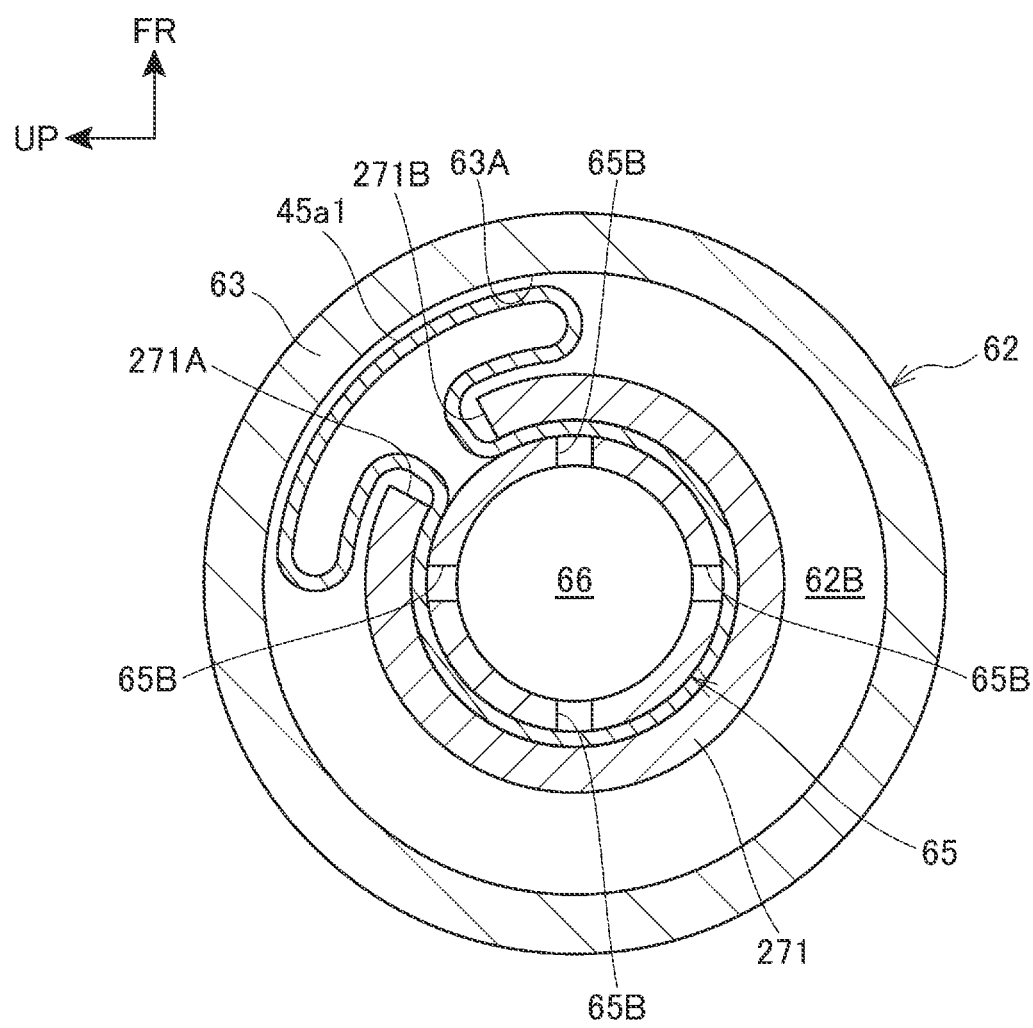
FIG. 10 is a sectional view along the line X-X of FIG. 9.

FIG. 9 is a sectional view of an inflator 43 of an airbag device 240 of the second embodiment. FIG. 10 is a sectional view along line X-X of FIG. 9.

In the second embodiment, the airbag device 240 includes a metal plate 271 as an example of the elastic member instead of the metal plate 71. The metal plate 271 has an inner circumferential surface 272 and an outer circumferential surface 273. The metal plate 271 is decreased to have a diameter smaller than the outer diameter of the gas ejection unit 65 in the natural state (first state). The metal plate 271 is integrally attached to the airbag 42. The outer circumferential surface of the airbag-side connection portion 45*a* is fixed to the inner circumferential surface 272 of the metal plate 271. A length L11 from an inner end portion 271C to an outer end portion 271D of the metal plate 271 in the axial direction is shorter than the length L2 from a fixing portion 77 in the axial direction of the housing 62. The metal plate 271 has the length L11 to overlap the gas ejection ports 65B of the gas ejection unit 65 in the axial direction. The metal plate 271 is disposed to have an overlapping portion 274 which overlaps the gas ejection port 65B in the axial direction.

As illustrated in FIG. 10, the airbag-side connection portion 45*a* has a warped portion 45*a*1 led outside from a space between one end 271A and the other end 271B of the metal plate 271 in the radial direction of the metal plate 271. Since the warped portion 45*a*1 is provided, the airbag-side connection portion 45*a* can be increased in diameter together with the metal plate 271 when the metal plate 271 is increased in diameter.

The metal plate 271 is fixed to the gas ejection unit 65 by being press-fitted therein via the airbag 42.

Consequently, in a normal state, the separation between the airbag 42 and the inflator 43 can be restricted by the press-fitting of the metal plate 271, and there is no need to provide an additional restriction portion for restricting the separation of the airbag 42 before deployment, in addition to a first restriction portion 290.

The inflator 43 includes the locking portion 64 positioned downstream of the gas ejection ports 65B in the inflator 43, that is, on the opening 64A side. The locking portion 64 includes an overlapping portion 64B. At least a part of the overlapping portion 64B overlaps, in the radial direction, the metal plate 271 increased in diameter by the gas having the maximum gas release pressure P1. On the other hand, the overlapping portion 64B is formed in a shape that does not overlap, in the radial direction, the metal plate 271 decreased in diameter by the gas having the deployment gas release pressure P2.

In the present embodiment, since the outer diameter of the metal plate 271 is larger than the inner diameter W0 of the opening 64A in the increased diameter state and is smaller than the inner diameter W0 of the opening 64A in the unlocked state, the overlapping portion 64B partially overlaps, in the radial direction, the metal plate 271 increased in diameter by the gas having the maximum gas release pressure P1 and does not overlap, in the radial direction, the metal plate 271 decreased in diameter by the gas having the deployment gas release pressure P2.

Since the locking portion 64 and the metal plate 271 overlap each other in the radial direction at the time of diameter increase, the airbag 42 can be restricted in the inflator 43 at the time of diameter increase. In this case, the number of components can be reduced, and the assemblability of assembling the metal plate 271 or the airbag 42 in the inflator 43 is improved.

The overlapping portion 64B is formed by an annular plate shape of the locking portion 64. The overlapping portion 64B may have, for example, a rod-shaped or a comb-shaped configuration provided at intervals in the circumferential direction, instead of the annular plate-shaped configuration.

The metal plate 271 is configured to be deformable into an increased diameter state (second state) in which the diameter of the metal plate is increased to be larger than that in the natural state by the gas having the maximum gas release pressure P1, and an increased diameter state where the outer circumferential wall 63 of the inflator 43 and the metal plate 271 enter the locked state. In the present embodiment, the locked state means a state where the metal plate 71 is brought into strongly pressed contact with the inner circumferential surface 63A of the outer circumferential wall 63. At this time, the metal plate 271 is configured to be plastically deformed beyond a range of elasticity from the natural state.

In addition, the metal plate 271 is configured to be deformable by the gas having the deployment gas release pressure P2 into an unlocked state (third state) in which the diameter of the metal plate is decreased to be smaller than that in the increased diameter state and an unlocked state where the locked state is canceled. The unlocked state becomes a state where the diameter of the metal plate 271 is decreased to be smaller than that of the opening 64A and is increased to be larger than that of the gas ejection unit 65. In the present embodiment, the metal plate 271 can be subjected to plastic deformation and transition to the increased diameter state, thereby entering a state where the diameter of the metal plate can be increased to be larger than that of the gas ejection unit 65 in the unlocked state.

The airbag device 240 of the present embodiment includes the first restriction portion 290. The first restriction portion 290 restricts separation between the inflator 43 and the airbag 42 when the airbag 42 is deployed. The first restriction portion 290 includes the metal plate 271 positioned inside the housing 62 of the inflator 43. The first restriction portion 290 moves the metal plate 271 between the increased diameter state and the unlocked state by using the pressure of the gas released from the inflator main body 61 of the inflator 43.

The first restriction portion 290 restricts the airbag 42 from being separated by deforming the metal plate 271 to the increased diameter state by the pressure of the gas released by the inflator main body 61 in a predetermined first gas release period including the time of release at the maximum gas release pressure P1. Specifically, the metal plate 271 is deformed into the increased diameter state and engages with the locking portion 64, thereby restricting the airbag 42 from being separated. In addition, after the first gas release period passes, the first restriction portion 290 deforms, in the second gas release period after the gas having the deployment gas release pressure P2 is released, the metal plate 71 to the unlocked state by a pressure of a gas released by the inflator main body 61 lower than a pressure of a gas released in the first gas release period, and thereby the restriction on the separation of the airbag 42 is canceled.

Figure 11:
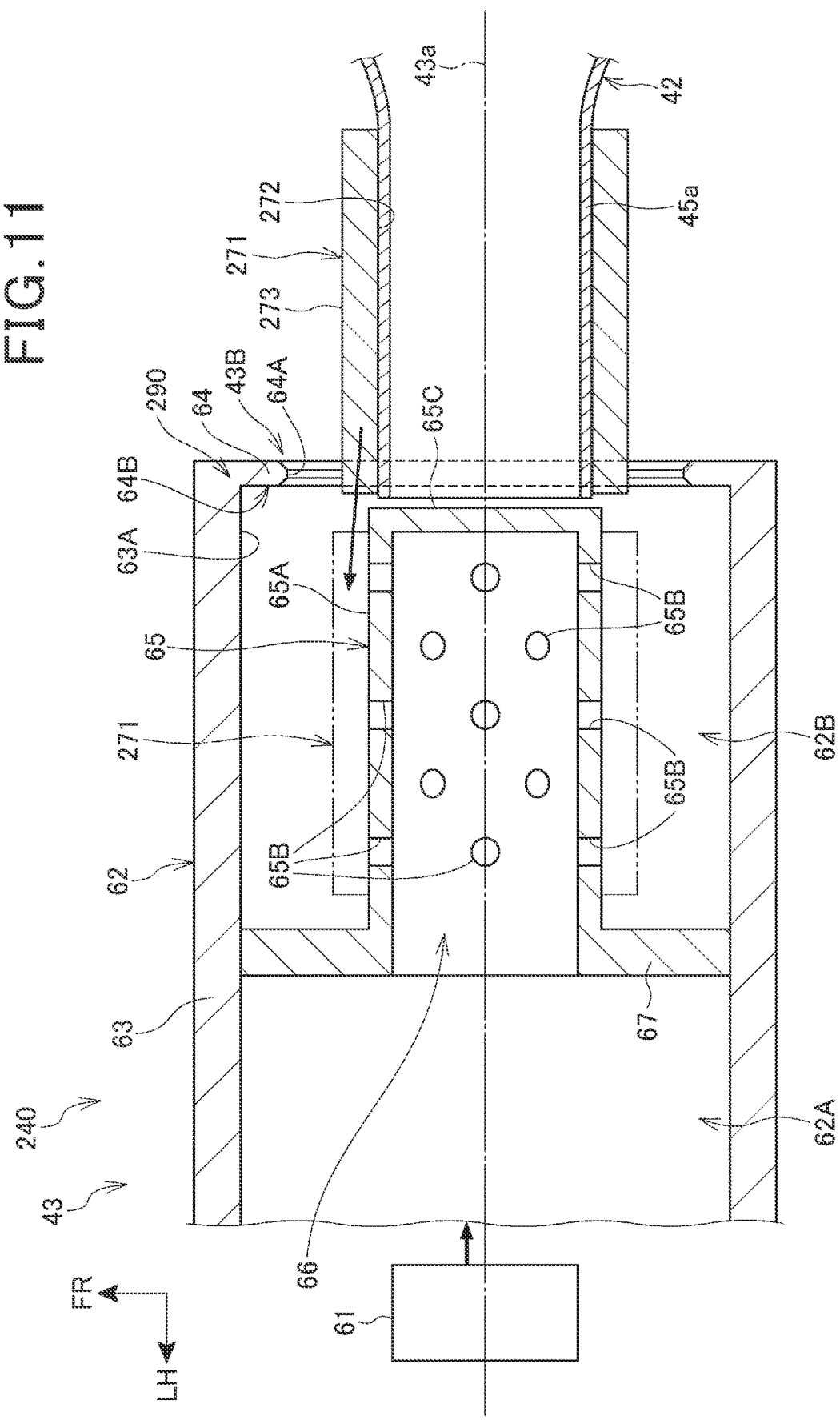
FIG. 11 is a view illustrating an example of a connection method for connecting an airbag to the inflator of the second embodiment.

FIG. 11 is a view illustrating an example of a connection method for connecting the airbag 42 to the inflator 43 of the second embodiment.

The metal plate 271 is fixed to the outer circumferential surface of the airbag-side connection portion 45a. The airbag-side connection portion 45a and the metal plate 271 are introduced into the gas ejection chamber 62B from the opening 64A of the inflator 43, the metal plate 271 is increased in diameter and press-fitted into the gas ejection unit 65, and thereby the metal plate 271 is fixed to the gas ejection unit 65. As a result, separation of the airbag 42 from the inflator 43 is restricted in the normal state. The airbag 42 is normally maintained in a state where the airbag is connected to the inside of the inflator 43.

Figure 12:
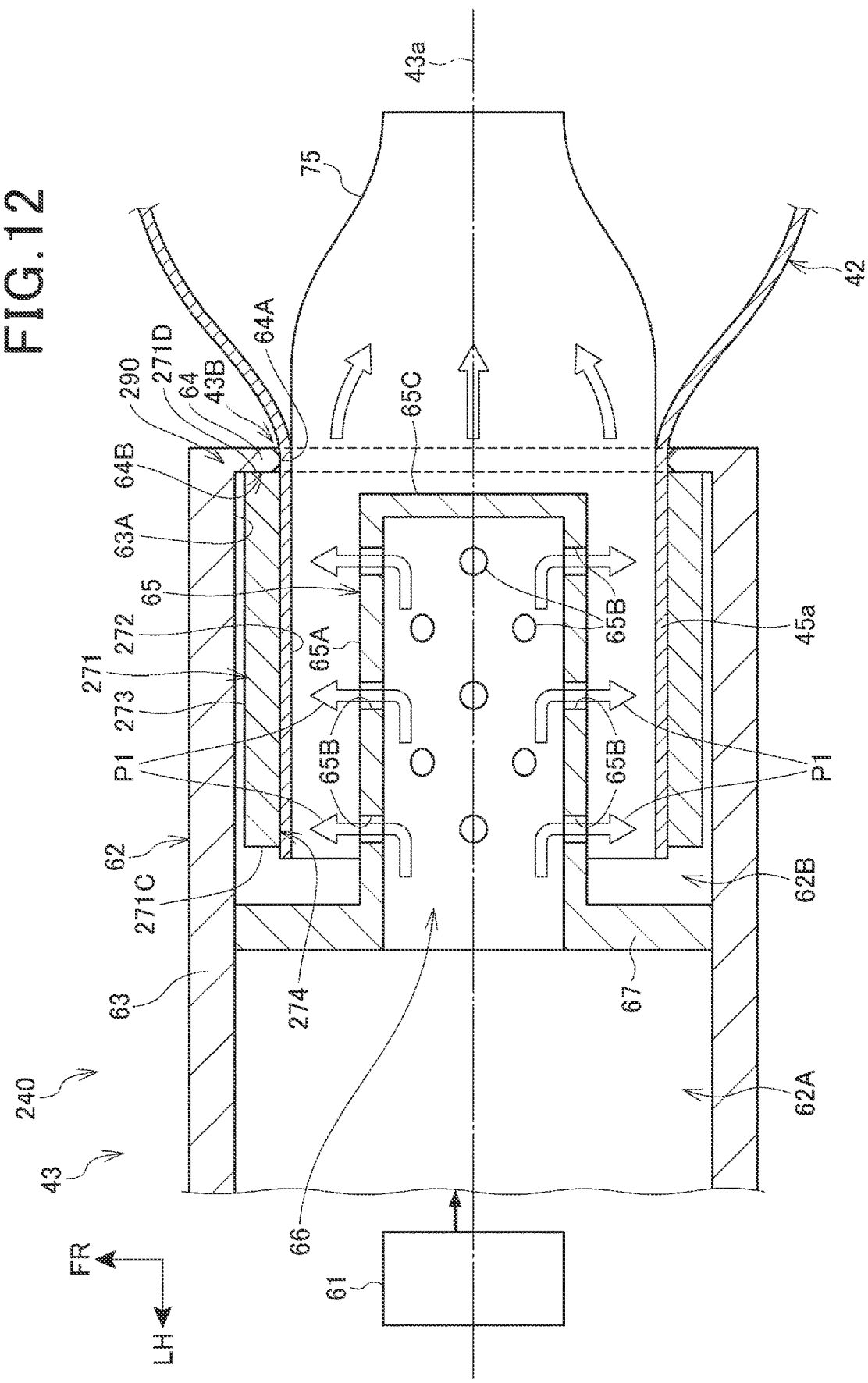
FIG. 12 is a view illustrating an operation of a first restriction portion in a case where the inflator of the second embodiment releases a gas having a maximum gas release pressure.
Figure 13:
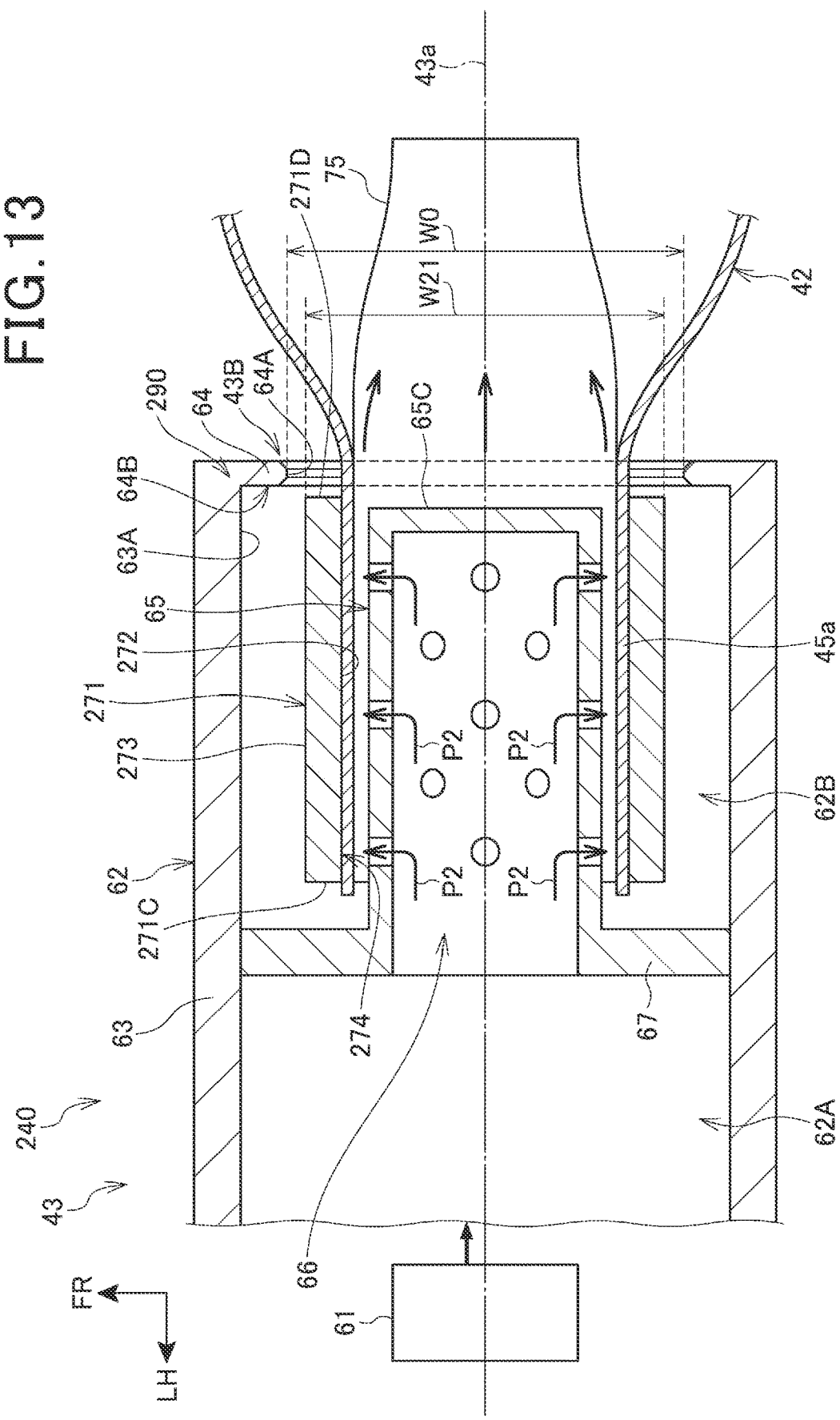
FIG. 13 is a view illustrating another operation of the first restriction portion in a case where the inflator of the second embodiment releases a gas having a deployment gas release pressure.

FIG. 12 is a view illustrating an operation of the first restriction portion 290 in a case where the inflator 43 of the second embodiment releases the gas having the maximum gas release pressure P1. FIG. 13 is a view illustrating another operation of the first restriction portion 290 in a case where the inflator 43 of the second embodiment releases the gas having the deployment gas release pressure P2.

In a case where the inflator main body 61 is actuated, similarly to the first embodiment, in the gas ejection chamber 62B, the gas is ejected in the radial direction, and the gas is ejected toward the inner circumferential surface 272 of the metal plate 271. Hence, the gas causes the metal plate 271 to be deformed toward the increased diameter state (second state) and is guided to the opening 64A side by the inner circumferential surface 272. The gas guided to the opening 64A side flows into the airbag 42 through the check valve 75 to inflate the airbag 42 and deploy the airbag 42.

At this time, a stronger force to increase the diameter of the metal plate 271 acts on the metal plate 271 than that in the natural state. In particular, when the inflator 43 generates the maximum gas release pressure P1, a force to cause the metal plate 71 to come into pressed contact with the inner circumferential surface 63A of the outer circumferential wall 63 acts on the metal plate 271, and the outer diameter of the outer circumferential surface 273 of the metal plate 271 becomes larger than the inner diameter W0 of the opening 64A. At this time, even if a force for detaching the airbag 42 in the axial direction acts on the airbag 42 according to the deployment of the airbag 42, an outer end portion 271D of the metal plate 271 in the axial direction engages with the locking portion 64, and the separation of the airbag 42 is restricted as illustrated in FIG. 12. Since the airbag 42 is fixed to the inner circumferential surface 272 of the metal plate 271, the metal plate 271 can directly abut on the locking portion 64, and the separation is accurately restricted.

After the inflator main body 61 releases the gas having the maximum gas release pressure P1, the gas pressure of the gas released from the inflator main body 61 is lower than the maximum gas release pressure P1. When the gas having the deployment gas release pressure P2 is released from the inflator main body 61, the airbag 42 enters a deployment state. In addition, a force received by the metal plate 271 from the gas is also weakened, and the metal plate 271 is elastically restored accordingly. At this time, since the metal plate 71 is plastically deformed, the metal plate does not return to the original natural state, and as illustrated in FIG. 13, the metal plate enters the unlocked state (third state) in which the diameter of the metal plate is decreased to be smaller than that of the opening 64A and the diameter thereof is increased to be larger than that of the gas ejection unit 65. Therefore, the metal plate 271 and the airbag-side connection portion 45a can be pulled out through the opening 64A. Specifically, the airbag 42 can be separated. Since the check valve 75 is provided in the airbag 42, the deployed state of the airbag is maintained even if the airbag 42 is separated from the inflator 43.

As described above, according to the second embodiment to which the present invention is applied, the airbag device 240 for a saddle-type vehicle includes the inflator 43 having the opening 64A, and the airbag 42 that is connected to the inside of the inflator 43 through the opening 64A and is deployed with the gas emitted by the inflator 43. The airbag device 240 for a saddle-type vehicle includes the first restriction portion 290 that restricts separation between the inflator 43 and the airbag 42 when the airbag 42 is deployed. The first restriction portion 290 includes the metal plate 271 positioned inside the inflator 43.

In the airbag device 240 for a saddle-type vehicle, when the inflator 43 releases the gas having the predetermined maximum gas release pressure P1, the metal plate 271 is increased in diameter due to the gas pressure of the inflator 43, and the inflator 43 and the metal plate 271 enter the locked state, so that the first restriction portion 290 restricts separation of the airbag 42. In addition, when the inflator 43 releases the gas having the predetermined deployment gas release pressure P2 lower than the maximum gas release pressure P1 after the gas having the maximum gas release pressure P1 is released, the metal plate 271 is decreased to have a diameter smaller than the diameter in the locked state, and the locked state is canceled, so that the first restriction portion 290 cancels the restriction on separation of the airbag 42.

Consequently, the airbag 42 can be restricted inside the inflator 43 by the diameter increase of the metal plate 271, and the airbag can be separated from the inflator 43 by the diameter decrease of the metal plate 271 in the state where the airbag 42 after the gas release is deployed.

In particular, in the present embodiment, the metal plate 271 is integrally attached to the airbag 42, and the metal plate 271 is positioned at the airbag-side connection portion 45a of the airbag 42. In addition, the inflator 43 includes the opening portion 43B, and the opening portion 43B has the locking portion 64. The metal plate 271 is positioned further inside the inflator 43 in the axial direction than the locking portion 64. The locking portion 64 includes the overlapping portion 64B that at least partially overlaps, in the radial direction, the metal plate 271 increased in diameter by the gas having the maximum gas release pressure P1, and the overlapping portion 64B is formed in a shape without overlapping, in the radial direction, the metal plate 271 decreased in diameter by the gas having the deployment gas release pressure P2.

Consequently, when the diameter of the metal plate 271 is increased, the metal plate 271 and the locking portion 64 overlap each other in the radial direction, so that the airbag 42 can be restricted in the inflator 43. In addition, according to this configuration, since the metal plate 271 and the airbag 42 are integrally attached to each other, the O-ring 81 and the like are not required, the number of components can be reduced, and the assemblability of assembling the metal plate 271 or the airbag 42 to the inflator 43 is improved.

In the present embodiment, at least a part of the metal plate 271 is press-fitted into the gas ejection unit 65.

Consequently, the separation between the airbag 42 and the inflator 43 can be restricted by the press-fitting of the metal plate 271 until the gas release, and there is no need to provide an additional restriction portion separated from the first restriction portion 290 including the metal plate 271.

Third Embodiment

A third embodiment to which the present invention is applied will be described. In the third embodiment, parts configured in the same manner as in the first embodiment or the second embodiment are denoted by the same reference numerals and will not be described.

Figure 14:
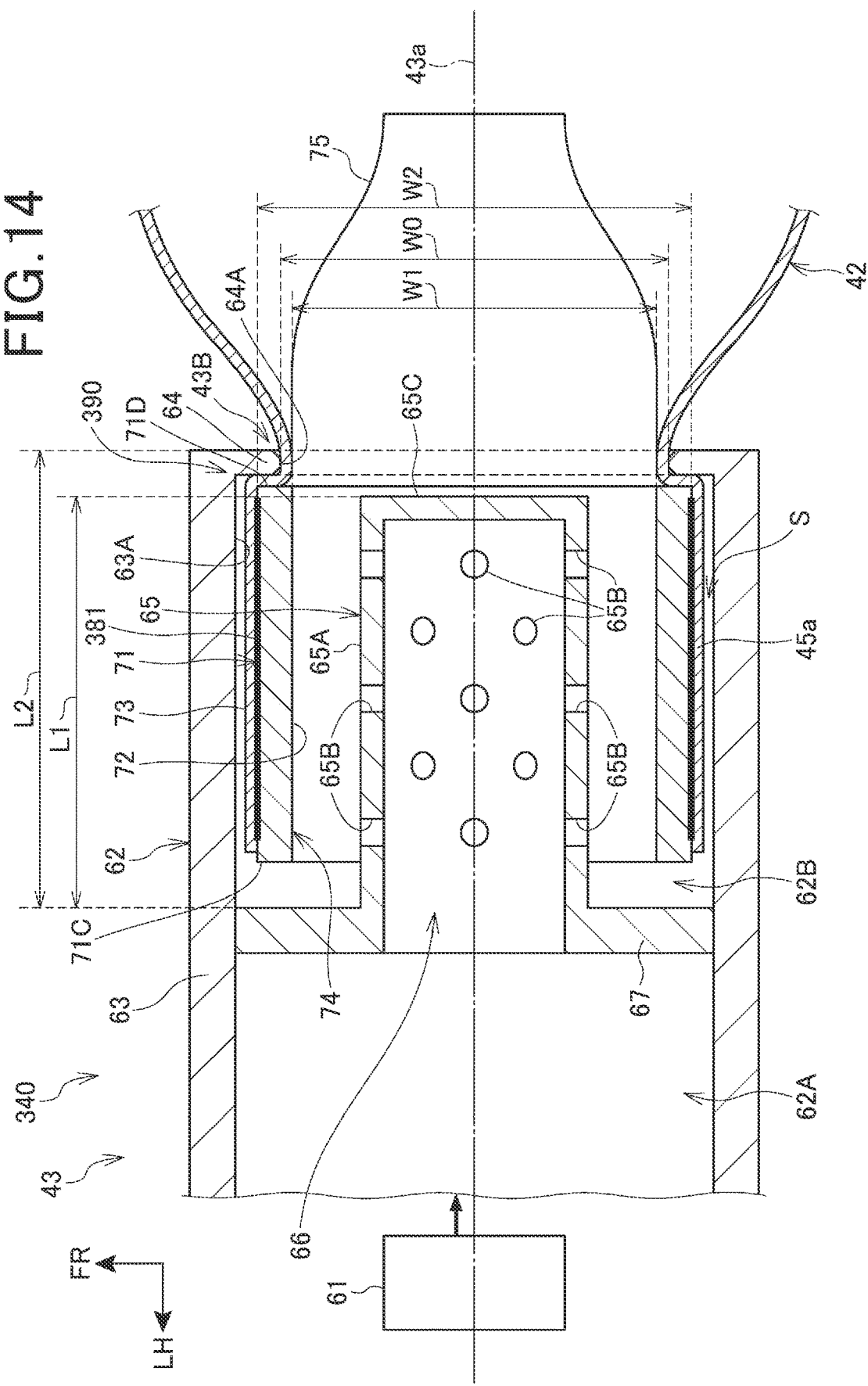
FIG. 14 is a sectional view of an inflator of an airbag device of a third embodiment of the present invention.

FIG. 14 is a sectional view of an inflator 43 of an airbag device 340 of the third embodiment of the present invention.

The airbag device 340 of the third embodiment differs from the airbag devices of the first and second embodiments in that an anchoring portion 381 is provided as a second restriction portion, instead of the O-ring 81 of the first embodiment. In the third embodiment, the airbag-side connection portion 45a and the outer circumferential surface 73 of the metal plate 71 are anchored with an adhesive. The airbag-side connection portion 45a includes the anchoring portion 381 anchored with an adhesive. The anchoring portion 381 is configured to be melted by the heat released from the inflator main body 61. In the present embodiment, the anchoring is performed with an adhesive, but for example, the anchoring may be performed with a sewing thread that is melted by the heat released from the inflator main body 61. Specifically, the metal plate 71 may have a hole through which the sewing thread passes, and the airbag-side connection portion 45a may be fixed to the metal plate 71 by the sewing thread.

In the third embodiment, when the gas having the maximum gas release pressure P1 is released, the metal plate 71 and the outer circumferential wall 63 enter the locked state similarly to the first embodiment, the airbag-side connection portion 45a is sandwiched between the metal plate 71 and the outer circumferential wall 63, and thereby the separation of the airbag 42 is restricted.

At this time, since the anchoring portion 381 is melted by the heat released from the inflator main body 61, the fixing between the metal plate 71 and the outer circumferential wall 63 is released. Hence, when the gas having the deployment gas release pressure P2 is released and the locked state is canceled, the airbag 42 can be separated from the first inflator 43.

As described above, according to the third embodiment to which the present invention is applied, similarly to the first embodiment, the airbag 42 can be restricted from being separated by being sandwiched between the outer circumferential wall 63 and the metal plate 71.

In particular, in the present embodiment, the second restriction portion 381 is the anchoring portion 381 that anchors the airbag 42 to the metal plate 71 or the inflator 43, the anchoring portion 381 is positioned downstream in the inflator 43, that is, downstream of the inner end portion 71C that is an end portion of the metal plate 71 positioned upstream in the inflator 43, and the anchoring portion 381 is melted by the heat at the time of the gas release of the inflator 43.

Consequently, the metal plate 71 or the inflator 43 can be easily assembled by the anchoring portion 381, and the length of the airbag 42 does not need to be longer than necessary. Specifically, the O-ring 81 does not need to extend to a fixing position, unlike the first embodiment.

Fourth Embodiment

A fourth embodiment to which the present invention is applied will be described. In the fourth embodiment, parts configured in the same manner as in the first to third embodiments are denoted by the same reference numerals and will not be described.

Figure 15:
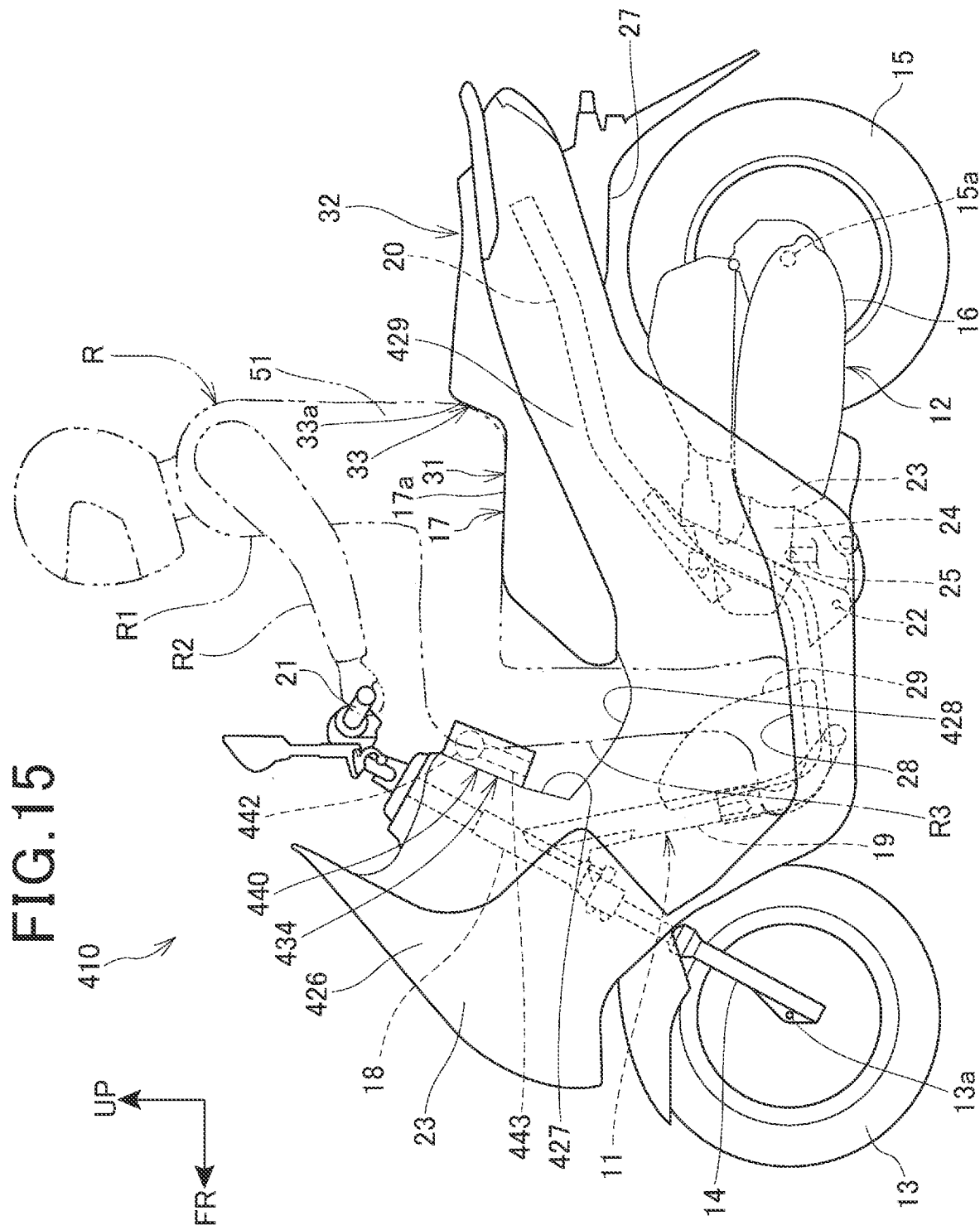
FIG. 15 is a view illustrating a saddle-type vehicle according to a fourth embodiment of the present invention.

FIG. 15 is a view illustrating a saddle-type vehicle 410 according to the fourth embodiment of the present invention.

The saddle-type vehicle 410 of the fourth embodiment includes an airbag device 440 instead of the airbag device 40. The saddle-type vehicle 410 includes, as a vehicle body cover 30, a front cover 426 that covers a front end portion of a vehicle body frame 11 from the front side and the left and right sides, an inner cover 427 that covers the head pipe 18 and the front frame 19 from a rear side, a center tunnel portion 428 that covers the vehicle body from the upper side and the left and right sides below the seat 17 and between the front frame 19 and the rear frame 20, and a rear cover 429 that covers the vehicle body below the seat 17 from the left and right sides behind the center tunnel portion 428.

The inner cover 427 is a leg shield that covers the legs R3 of the driver R seated on the seat 17 from the front side. The center tunnel portion 428 is positioned behind the inner cover 427. The center tunnel portion 428 has a tunnel shape bulging upward from the step 28 at a center portion in the vehicle width direction. The center tunnel portion 428 is a tunnel-shaped cover extending forward and backward, and a component such as a fuel tank is disposed in the center tunnel portion 428. The driver R puts his/her foot on step 28 while straddling the center tunnel portion 428 from side to side.

The airbag device 440 is attached to a rear surface portion of the inner cover 427 in front of the seat 17 and above the center tunnel portion 428. The airbag device 440 is disposed at the center in the vehicle width direction. The airbag device 440 is provided at a position overlapping the head pipe 18 from the rear side, but may be disposed at a position higher than the head pipe 18.

In the present embodiment, an airbag accommodating portion 434 that accommodates the airbag device 440 is provided above the center tunnel portion 428 and above a rear surface of the inner cover 427. The airbag 42 is deployed from the airbag accommodating portion 434 toward the driver R.

The airbag device 440 includes an inflator 443 similar to the inflator 43 and an airbag 442 connected to the inflator 443. The airbag 442 is detachably connected to the inflator 443 similarly to the first embodiment. Consequently, the airbag 442 can also be separated from the airbag device 440 disposed below the handlebar 21.

Other Embodiments

The above-described embodiments merely describe one aspect of the present invention and can be optionally modified and applied without departing from the gist of the present invention.

In the above embodiments, the configuration in which the outer circumferential wall 63 of the housing 62 corresponds to the circumferential portion has been described, but as the circumferential portion, for example, a cylinder may be provided between the outer circumferential wall 63 and the gas ejection unit 65. Alternatively, as the circumferential portion, an outer circumferential wall overlapping the gas ejection unit 65 in the axial direction may be provided as a separate cylinder on the outer circumference of the housing 62.

In the above embodiments, the configuration in which the outer circumferential wall 63 as the circumferential portion has the cylindrical shape has been described, but the outer circumferential wall 63 may have a shape in which a slit, a hole, or the like extending in the axial direction is provided.

In the above embodiments, the configuration in which the second restriction portion 81 or 381 is melted by the heat of the gas released from the inflator main body 61 has been described, but the second restriction portion 81 or 381 may be burned out by the heat of the released gas.

In the third embodiment, the metal plate 71 and the airbag 42 are anchored to each other by the anchoring portion 381, but may be anchored to the inflator 43. Specifically, for example, an outer surface of the airbag-side connection portion 45a may adhere to the inner circumferential surface 63A of the outer circumferential wall 63 with an adhesive that is melted by heat.

In the above embodiments, the description has been given with regard to a motorcycle including the front wheel 13 and the rear wheel 15, as an example of the saddle-type vehicle 10. However, the present invention is not limited to this. The present invention is applicable to a three-wheel saddle-type vehicle including two front wheels or two rear wheels or a saddle-type vehicle including four or more wheels.

Configuration Supported by the Above Embodiments The above embodiments support the following configurations.

(Configuration 1) An airbag device for a saddle-type vehicle which includes an inflator having an opening, and an airbag that is connected to an inside of the inflator through the opening and is deployed with a gas released by the inflator, the airbag device including: a first restriction portion that restricts separation between the inflator and the airbag when the airbag is deployed, in which the first restriction portion has an elastic member positioned inside the inflator. When the inflator releases a gas having a predetermined first gas release pressure, the elastic member is increased in diameter due to the gas pressure of the inflator, and the inflator and the elastic member enter a locked state, so that the first restriction portion restricts separation of the airbag. When the inflator releases a gas having a predetermined second gas release pressure lower than the first gas release pressure after the gas having the first gas release pressure is released, the elastic member is decreased to have a diameter smaller than the diameter in the locked state, and the locked state is canceled, so that the first restriction portion cancels restriction on separation of the airbag.

According to this configuration, it is possible to provide an airbag device for a saddle-type vehicle which can restrict an airbag from being separated until the airbag is deployed so that the airbag can be separated in a deployed state.

(Configuration 2) The airbag device for a saddle-type vehicle according to Configuration 1, in which the inflator includes a gas ejection unit that extends in an axial direction and that has a hollow gas ejection passage inside the gas ejection unit, and a plurality of gas ejection ports communicating with the gas ejection passage are formed in an outer circumferential surface of the gas ejection unit.

According to this configuration, the gas ejection ports can be formed in a simple shape.

(Configuration 3) The airbag device for a saddle-type vehicle according to Configuration 2, in which the elastic member is disposed to have an overlapping portion which at least partially overlaps the gas ejection port in the axial direction.

According to this configuration, the diameter of the elastic member can be increased by being pushed with the gas from the inner circumferential surface side.

(Configuration 4) The airbag device for a saddle-type vehicle according to Configuration 2 or 3, in which the gas ejection unit is positioned inside the inflator in the axial direction.

According to this configuration, the length of the gas ejection unit can be set to a suitable and sufficient length.

(Configuration 5) The airbag device for a saddle-type vehicle according to any one of Configurations 2 to 4, in which a check valve is attached to the airbag.

According to this configuration, the gas can be suppressed from escaping from the airbag after the airbag is separated from the inflator.

(Configuration 6) The airbag device of a saddle-type vehicle according to Configurations 2 to 5, in which the inflator has a circumferential portion provided around the gas ejection unit, a part of the airbag is positioned between the circumferential portion and the elastic member in a radial direction, and the elastic member is increased in diameter, and the airbag is sandwiched between the circumferential portion) and the elastic member, so that separation of the airbag is restricted.

According to this configuration, the diameter increase of the elastic member can result in locking the airbag in the inflator by the inflator and the elastic member.

(Configuration 7) The airbag device of a saddle-type vehicle according to any one of Configurations 2 to 6, including: a second restriction portion that restricts the airbag from being separated from the inflator in a state before gas release, in which the second restriction portion is unrestricted by heat generated at the time of gas release from the inflator.

According to this configuration, the second restriction portion can restrict the airbag from being separated from the inside of the inflator in the normal state before the gas release. In addition, since the restriction of the second restriction portion can be canceled by the gas heat for deploying the airbag, there is no need to provide a dedicated structure for canceling the restriction of the second restriction portion.

(Configuration 8) The airbag device of a saddle-type vehicle according to Configuration 7, in which the inflator has a circumferential portion provided around the gas ejection unit, the second restriction portion is provided in the airbag and is positioned upstream of an inner end portion in the inflator, the inner end portion being an end portion of the elastic member positioned upstream in the inflator, and a diameter is larger than a gap between the circumferential portion and the elastic member in the radial direction.

According to this configuration, the airbag can be locked inside the inflator without using an adhesive.

(Configuration 9) The airbag device for a saddle-type vehicle according to Configuration 7 or 8, in which the second restriction portion is melted by heat at the time of gas release from the inflator.

According to this configuration, after the restriction of the separation by the elastic member, the second restriction portion is melted, so that the airbag can be separated from the inflator.

(Configuration 10) The airbag device of a saddle-type vehicle according to Configuration 7, in which the second restriction portion is an anchoring portion that anchors the airbag to the elastic member or the inflator, the anchoring portion is positioned downstream of an inner end portion in the inflator, the inner end portion being an end portion of the elastic member positioned upstream in the inflator, and the anchoring portion is melted by heat at the time of gas release from the inflator.

According to this configuration, the elastic member or the inflator can be easily assembled by the anchoring portion, and the length of the airbag does not need to be longer than necessary.

(Configuration 11) The airbag device of a saddle-type vehicle according to any one of Configurations 2 to 6, in which the elastic member is integrally attached to the airbag, the inflator has an opening portion, the opening portion has a locking portion, the elastic member is positioned further inside the inflator in the axial direction than the locking portion, the locking portion has an overlapping portion that at least partially overlaps, in the radial direction, the elastic member increased in diameter by the gas having the first gas release pressure, and the overlapping portion is formed in a shape that does not overlap, in the radial direction, the elastic member decreased to have a small diameter by the gas having the second gas release pressure.

According to this configuration, when the diameter of the elastic member is increased, the elastic member and the locking portion overlap each other, so that the airbag can be restricted inside of the inflator. In addition, since the elastic member and the airbag are integrally attached to each other, the number of components can be reduced, and the assemblability of assembling the elastic member or the airbag to the inflator is improved.

(Configuration 12) The airbag device of a saddle-type vehicle according to Configuration 11, in which at least a part of the elastic member is press-fitted into the gas ejection unit.

According to this configuration, the separation between the airbag and the inflator can be restricted by the press-fitting of the elastic member until the gas release, and there is no need to provide an additional restriction portion separated from the first restriction portion including the elastic member.

REFERENCE SIGNS LIST 10 saddle-type vehicle
42 airbag
43 inflator
43B opening portion
45a airbag-side connection portion (upstream end portion)
63 outer circumferential wall (circumferential portion)
64 locking portion
64A opening
64B overlapping portion
65 gas ejection unit
66 gas ejection passage
65A outer circumferential surface
65B gas ejection port
71 metal plate (elastic member)
71C inner end portion
74 overlapping portion
75 check valve
81 O-ring (second restriction portion)
81R diameter
90 first restriction portion
271 metal plate (elastic member)
274 overlapping portion
290 first restriction portion
381 anchoring portion (second restriction portion)
390 first restriction portion
410 saddle-type vehicle
P1 maximum gas release pressure (first gas release pressure)
P2 deployment gas release pressure (second gas release pressure)
S gap

The invention claimed is:

1. An airbag device for a saddle vehicle which includes an inflator having an opening, and an airbag that is connected to an inside of the inflator through the opening and is deployed with a gas released by the inflator, the airbag device comprising:
a first restriction portion that restricts separation between the inflator and the airbag when the airbag is deployed, wherein
the first restriction portion has an elastic member positioned inside the inflator,
when the inflator releases a gas having a predetermined first gas release pressure, the elastic member is increased in diameter due to the gas pressure of the inflator, and the inflator and the elastic member enter a locked state, so that the first restriction portion restricts separation of the airbag, and
when the inflator releases a gas having a predetermined second gas release pressure lower than the first gas release pressure after the gas having the first gas release pressure is released, the elastic member is decreased to have a diameter smaller than the diameter in the locked state, and the locked state is canceled, so that the first restriction portion releases restriction on separation of the airbag.

2. The airbag device of a saddle vehicle according to claim 1, wherein
the inflator includes a gas ejection unit that extends in an axial direction and that has a hollow gas ejection passage inside the gas ejection unit, and
a plurality of gas ejection ports communicating with the gas ejection passage are formed in an outer circumferential surface of the gas ejection unit.

3. The airbag device of a saddle vehicle according to claim 2, wherein
the elastic member is disposed to have an overlapping portion which at least partially overlaps the gas ejection port in the axial direction.

4. The airbag device of a saddle vehicle according to claim 2, wherein
the gas ejection unit is positioned inside the inflator in the axial direction.

5. The airbag device of a saddle vehicle according to claim 2, wherein
a check valve is attached to the airbag.

6. The airbag device of a saddle vehicle according to claim 2, wherein
the inflator has a circumferential portion provided around the gas ejection unit,
a part of the airbag is positioned between the circumferential portion and the elastic member in a radial direction, and
the elastic member is increased in diameter, and the airbag is sandwiched between the circumferential portion and the elastic member, so that separation of the airbag is restricted.

7. The airbag device of a saddle vehicle according to claim 2, comprising:

a second restriction portion that restricts the airbag airbag from being separated from the inflator in a state before gas release, wherein
the second restriction portion is unrestricted by heat generated at the time of gas release from the inflator.

8. The airbag device of a saddle vehicle according to claim 7, wherein
the inflator has a circumferential portion provided around the gas ejection unit,
the second restriction portion is provided in the airbag and is positioned upstream of an inner end portion in the inflator, the inner end portion being an end portion of the elastic member positioned upstream in the inflator, and
a diameter is larger than a gap between the circumferential portion and the elastic member in the radial direction.

9. The airbag device of a saddle vehicle according to claim 7, wherein
the second restriction portion is melted by heat at the time of gas release from the inflator.

10. The airbag device of a saddle vehicle according to claim 7, wherein
the second restriction portion is an anchoring portion that anchors the airbag to the elastic member or the inflator,
the anchoring portion is positioned downstream of an inner end portion in the inflator, the inner end portion being an end portion of the elastic member positioned upstream in the inflator, and
the anchoring portion is melted by heat at the time of gas release from the inflator.

11. The airbag device of a saddle vehicle according to claim 2, wherein
the elastic member is integrally attached to the airbag,
the inflator has an opening portion,
the opening portion has a locking portion,
the elastic member is positioned further inside the inflator in the axial direction than the locking portion,
the locking portion has an overlapping portion that at least partially overlaps, in the radial direction, the elastic member increased to have the large diameter by the gas having the first gas release pressure, and
the overlapping portion is formed in a shape that does not overlap, in the radial direction, the elastic member decreased to have a small diameter by the gas having the second gas release pressure.

12. The airbag device of a saddle vehicle according to claim 11, wherein
at least a part of the elastic member is press-fitted into the gas ejection unit.

* * * * *